United States Patent
Wu et al.

(10) Patent No.: US 11,825,440 B2
(45) Date of Patent: Nov. 21, 2023

(54) VEHICULAR AND CELLULAR WIRELESS DEVICE COLOCATION USING UPLINK COMMUNICATIONS

(71) Applicant: QUALCOMM Incorporated, San Diego, CA (US)

(72) Inventors: Shuanshuan Wu, San Diego, CA (US); Junyi Li, Franklin Park, NJ (US); Hong Cheng, Basking Ridge, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 74 days.

(21) Appl. No.: 17/192,817

(22) Filed: Mar. 4, 2021

(65) Prior Publication Data
US 2022/0287001 A1  Sep. 8, 2022

(51) Int. Cl.
*H04W 64/00* (2009.01)
*H04W 4/40* (2018.01)
(Continued)

(52) U.S. Cl.
CPC ......... *H04W 64/006* (2013.01); *H04L 5/0051* (2013.01); *H04L 25/0226* (2013.01);
(Continued)

(58) Field of Classification Search
CPC ..... H04W 64/006; H04W 4/027; H04W 4/40; H04W 92/18; H04L 5/0051; H04L 25/0226
See application file for complete search history.

(56) References Cited

U.S. PATENT DOCUMENTS

| | | |
|---|---|---|
| 2013/0324114 A1 | 12/2013 | Raghothaman et al. |
| 2015/0111560 A1 | 4/2015 | Rogitz |
| | (Continued) | |

FOREIGN PATENT DOCUMENTS

| | | |
|---|---|---|
| EP | 3133842 B1 | 7/2019 |
| EP | 3644634 A1 | 4/2020 |
| | (Continued) | |

OTHER PUBLICATIONS

International Search Report and Written Opinion—PCT/US2022/016721—ISA/EPO—dated May 20, 2022.
(Continued)

*Primary Examiner* — Chae S Lee
(74) *Attorney, Agent, or Firm* — Holland & Hart LLP/Qualcomm Incorporated

(57) ABSTRACT

Methods, systems, and devices for wireless communications are described. A base station may be co-located with a sidelink wireless device, such as a road-side unit (RSU). The base station may determine that a cellular user equipment (C-UE) and a vehicle UE (V-UE) are co-located, and altering downlink communications to the C-UE. The RSU may communicate over sidelink with a V-UE, and determine positioning information of a V-UE. The base station may communicate with a C-UE using downlink and uplink communications (e.g., Uu communications), and may determine some positioning information of a C-UE. The base station and RSU may communicate the positioning information of each device, and the base station may determine that the C-UE and V-UE are co-located. The base station may alter a feedback configuration for the C-UE based on the co-location determination.

26 Claims, 16 Drawing Sheets

(51) Int. Cl.
    *H04L 5/00*           (2006.01)
    *H04L 25/02*        (2006.01)
    *H04W 4/02*         (2018.01)
    *H04W 92/18*       (2009.01)

(52) U.S. Cl.
    CPC ............. *H04W 4/027* (2013.01); *H04W 4/40* (2018.02); *H04W 92/18* (2013.01)

(56) References Cited

U.S. PATENT DOCUMENTS

| | | |
|---|---|---|
| 2016/0014589 A1 | 1/2016 | Niu et al. |
| 2017/0134080 A1 | 5/2017 | Rahman et al. |
| 2018/0035255 A1* | 2/2018 | Kordybach ............. H04W 4/46 |
| 2018/0070281 A1 | 3/2018 | Wu et al. |
| 2018/0295534 A1 | 10/2018 | Huang et al. |
| 2019/0021040 A1* | 1/2019 | Chae ..................... H04W 4/021 |
| 2019/0028862 A1 | 1/2019 | Futaki |
| 2019/0116475 A1* | 4/2019 | Lee ......................... H04W 4/40 |
| 2019/0223231 A1 | 7/2019 | Muraoka et al. |
| 2019/0327618 A1 | 10/2019 | Li et al. |
| 2019/0360823 A1 | 11/2019 | Nelson et al. |
| 2020/0107172 A1 | 4/2020 | Bharadwaj et al. |
| 2020/0120458 A1 | 4/2020 | Aldana et al. |
| 2020/0146094 A1 | 5/2020 | Wu et al. |
| 2020/0154501 A1 | 5/2020 | Cheng et al. |
| 2020/0288535 A1 | 9/2020 | Sharma et al. |
| 2021/0153270 A1 | 5/2021 | Wang et al. |
| 2021/0185685 A1 | 6/2021 | Ryu et al. |
| 2021/0250910 A1 | 8/2021 | Park et al. |
| 2021/0273714 A1 | 9/2021 | Lee |
| 2021/0282098 A1 | 9/2021 | Luo et al. |
| 2021/0357940 A1* | 11/2021 | Benkreira ............. H04W 12/08 |
| 2022/0070844 A1 | 3/2022 | Lee et al. |
| 2022/0229146 A1 | 7/2022 | Ko et al. |
| 2022/0256357 A1* | 8/2022 | Kim ....................... H04W 72/12 |
| 2022/0286827 A1 | 9/2022 | Cheng et al. |
| 2022/0287113 A1 | 9/2022 | Wu et al. |

FOREIGN PATENT DOCUMENTS

| | | |
|---|---|---|
| EP | 3687195 A1 | 7/2020 |
| JP | 2019212954 A | 12/2019 |
| WO | WO-2017134578 A1 * | 8/2017 |

OTHER PUBLICATIONS

Massimo C., et al., "5G V2X System-Level Architecture of 5GCAR Project", Future Internet, vol. 11, No. 10, Oct. 19, 2019 (Oct. 19, 2019), XP055859654, 26 Pages, DOI: 10.3390/fi11100217 p. 1-p. 26.

* cited by examiner

VEHICULAR AND CELLULAR WIRELESS DEVICE COLOCATION USING UPLINK COMMUNICATIONS

FIELD OF TECHNOLOGY

The following relates to wireless communications, including vehicular and cellular wireless device colocation using uplink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some types of UEs may be cellular UEs (C-UEs) and some types of UEs may be vehicle UEs (V-UEs). In some cases, a C-UE and a V-UE may be co-located. For example, a C-UE may be located near a V-UE, and may travel and move along with the V-UE. Further, base stations may be co-located with road-side units (RSUs). The RSUs may be sidelink communications devices. A base station communicating using a Uu communications link may communicate with a C-UE, and a RSU communicating over a sidelink channel may communicate with other sidelink devices, including V-UEs.

SUMMARY

The described techniques relate to improved methods, systems, devices, and apparatuses that support vehicular and cellular wireless device colocation using uplink communications. Generally, the described techniques provide for a base station, co-located with a sidelink wireless device, such as a road-side unit (RSU), determining that a cellular user equipment (C-UE) and a vehicle UE (V-UE) are co-located, and performing downlink communications to the C-UE. The RSU may communicate over sidelink with a V-UE, and determine positioning information of a V-UE. The base station may communicate with a C-UE using downlink and uplink communications (e.g., Uu communications), and may determine some positioning information of a C-UE. The base station and RSU may communicate the positioning information of each device, and the base station may determine that the C-UE and V-UE are co-located. The base station may update or change a feedback configuration for the C-UE based on the co-location.

A method for wireless communications at a sidelink wireless device is described. The method may include receiving positioning information of a V-UE in communication with the sidelink wireless device over a sidelink communications link, receiving, from a base station co-located with the sidelink wireless device, positioning information of a C-UE in communication with the base station, determining that the C-UE and the V-UE are co-located based on the positioning information of the V-UE and the positioning information of the C-UE, and transmitting, to the base station, an indication of the V-UE and the C-UE being co-located based on the determining.

An apparatus for wireless communications at a sidelink wireless device is described. The apparatus may include a processor, memory coupled with the processor, and instructions stored in the memory. The instructions may be executable by the processor to cause the apparatus to receive positioning information of a V-UE in communication with the sidelink wireless device over a sidelink communications link, receive, from a base station co-located with the sidelink wireless device, positioning information of a C-UE in communication with the base station, determine that the C-UE and the V-UE are co-located based on the positioning information of the V-UE and the positioning information of the C-UE, and transmit, to the base station, an indication of the V-UE and the C-UE being co-located based on the determining.

Another apparatus for wireless communications at a sidelink wireless device is described. The apparatus may include means for receiving positioning information of a V-UE in communication with the sidelink wireless device over a sidelink communications link, means for receiving, from a base station co-located with the sidelink wireless device, positioning information of a C-UE in communication with the base station, means for determining that the C-UE and the V-UE are co-located based on the positioning information of the V-UE and the positioning information of the C-UE, and means for transmitting, to the base station, an indication of the V-UE and the C-UE being co-located based on the determining.

A non-transitory computer-readable medium storing code for wireless communications at a sidelink wireless device is described. The code may include instructions executable by a processor to receive positioning information of a V-UE in communication with the sidelink wireless device over a sidelink communications link, receive, from a base station co-located with the sidelink wireless device, positioning information of a C-UE in communication with the base station, determine that the C-UE and the V-UE are co-located based on the positioning information of the V-UE and the positioning information of the C-UE, and transmit, to the base station, an indication of the V-UE and the C-UE being co-located based on the determining.

Some examples of the method, apparatuses, and non-transitory computer-readable medium described herein may further include operations, features, means, or instructions for receiving sidelink signaling from the V-UE where the positioning information includes a location of the V-UE, a speed of the V-UE, a trajectory of the V-UE, or any combination thereof, based on the sidelink signaling.

In some examples of the method, apparatuses, and non-transitory computer-readable medium described herein, determining that the C-UE and the V-UE may be co-located may include operations, features, means, or instructions for determining that the positioning information of the C-UE and the positioning information of the V-UE includes one or more of a same location, at least a partially overlapping trajectory, at least a partially overlapping trajectory for a threshold period of time, or a combination thereof.

Some examples of the method, apparatuses, and non-transitory computer-readable medium described herein may further include operations, features, means, or instructions for transmitting application layer information of the V-UE to the base station, the application layer information including one or more of location information of the V-UE, speed information of the V-UE, trajectory information of the V-UE, or a combination thereof.

A method for wireless communications at a base station is described. The method may include receiving positioning information of a C-UE, transmitting the positioning information of the C-UE to a sidelink wireless device co-located with the base station and in communication with a V-UE, and receiving, from the sidelink wireless device, an indication of the V-UE and the C-UE being co-located.

An apparatus for wireless communications at a base station is described. The apparatus may include a processor, memory coupled with the processor, and instructions stored in the memory. The instructions may be executable by the processor to cause the apparatus to receive positioning information of a C-UE, transmit the positioning information of the C-UE to a sidelink wireless device co-located with the base station and in communication with a V-UE, and receive, from the sidelink wireless device, an indication of the V-UE and the C-UE being co-located.

Another apparatus for wireless communications at a base station is described. The apparatus may include means for receiving positioning information of a C-UE, means for transmitting the positioning information of the C-UE to a sidelink wireless device co-located with the base station and in communication with a V-UE, and means for receiving, from the sidelink wireless device, an indication of the V-UE and the C-UE being co-located.

A non-transitory computer-readable medium storing code for wireless communications at a base station is described. The code may include instructions executable by a processor to receive positioning information of a C-UE, transmit the positioning information of the C-UE to a sidelink wireless device co-located with the base station and in communication with a V-UE, and receive, from the sidelink wireless device, an indication of the V-UE and the C-UE being co-located.

Some examples of the method, apparatuses, and non-transitory computer-readable medium described herein may further include operations, features, means, or instructions for receiving a feedback message from the C-UE, where the feedback message corresponds to a downlink beam direction to be used for a downlink transmission to the C-UE, where the positioning information may be based on the feedback message.

Some examples of the method, apparatuses, and non-transitory computer-readable medium described herein may further include operations, features, means, or instructions for receiving a sounding reference signal (SRS) from the C-UE, where the positioning information may be based on the SRS.

Some examples of the method, apparatuses, and non-transitory computer-readable medium described herein may further include operations, features, means, or instructions for estimating an angle of arrival (AoA) parameter of the SRS, where the positioning information of the C-UE may be based on the AoA parameter.

Some examples of the method, apparatuses, and non-transitory computer-readable medium described herein may further include operations, features, means, or instructions for receiving an indication of the positioning information from the C-UE via a Uu communications link between the base station and the C-UE, where the positioning information of the C-UE may be based on the indication of the positioning information.

Some examples of the method, apparatuses, and non-transitory computer-readable medium described herein may further include operations, features, means, or instructions for receiving positioning information of a V-UE from the sidelink wireless device co-located with the base station.

Some examples of the method, apparatuses, and non-transitory computer-readable medium described herein may further include operations, features, means, or instructions for reducing a feedback frequency for communications with the C-UE based on determining that the C-UE and the V-UE may be co-located.

Some examples of the method, apparatuses, and non-transitory computer-readable medium described herein may further include operations, features, means, or instructions for reducing a SRS frequency for communications with the C-UE based on determining that the C-UE and the V-UE may be co-located.

Some examples of the method, apparatuses, and non-transitory computer-readable medium described herein may further include operations, features, means, or instructions for configuring a period for periodic feedback messages or periodic SRSs based on determining that the C-UE and the V-UE may be co-located.

Some examples of the method, apparatuses, and non-transitory computer-readable medium described herein may further include operations, features, means, or instructions for determining a downlink transmission beam direction or a downlink transmission beam codebook for communicating with the C-UE or the V-UE, or both, based on determining that the V-UE and the C-UE may be co-located.

A method for wireless communications at a base station is described. The method may include receiving positioning information of a V-UE from a sidelink wireless device co-located with the base station and in communication with the V-UE, receiving positioning information of a C-UE, and determining that the C-UE and the V-UE are co-located based on the positioning information of the V-UE and the positioning information of the C-UE.

An apparatus for wireless communications at a base station is described. The apparatus may include a processor, memory coupled with the processor, and instructions stored in the memory. The instructions may be executable by the processor to cause the apparatus to receive positioning information of a V-UE from a sidelink wireless device co-located with the base station and in communication with the V-UE, receive positioning information of a C-UE, and determine that the C-UE and the V-UE are co-located based on the positioning information of the V-UE and the positioning information of the C-UE.

Another apparatus for wireless communications at a base station is described. The apparatus may include means for receiving positioning information of a V-UE from a sidelink wireless device co-located with the base station and in communication with the V-UE, means for receiving positioning information of a C-UE, and means for determining that the C-UE and the V-UE are co-located based on the positioning information of the V-UE and the positioning information of the C-UE.

A non-transitory computer-readable medium storing code for wireless communications at a base station is described. The code may include instructions executable by a processor to receive positioning information of a V-UE from a sidelink wireless device co-located with the base station and in communication with the V-UE, receive positioning information of a C-UE, and determine that the C-UE and the V-UE are co-located based on the positioning information of the V-UE and the positioning information of the C-UE.

Some examples of the method, apparatuses, and non-transitory computer-readable medium described herein may further include operations, features, means, or instructions for receiving a feedback message from the C-UE, where the feedback message corresponds to a downlink beam direction to be used for a downlink transmission to the C-UE, where the positioning information may be based on the feedback message.

Some examples of the method, apparatuses, and non-transitory computer-readable medium described herein may further include operations, features, means, or instructions for receiving a SRS from the C-UE, where the positioning information may be based on the SRS.

Some examples of the method, apparatuses, and non-transitory computer-readable medium described herein may further include operations, features, means, or instructions for estimating an AoA parameter of the SRS, where the positioning information may be based on the AoA parameter.

Some examples of the method, apparatuses, and non-transitory computer-readable medium described herein may further include operations, features, means, or instructions for receiving an indication of the positioning information from the C-UE via a Uu communications link between the base station and the C-UE, where the positioning information of the C-UE may be based on the indication.

Some examples of the method, apparatuses, and non-transitory computer-readable medium described herein may further include operations, features, means, or instructions for receiving positioning information of a V-UE from the sidelink wireless device co-located with the base station, where the positioning information may be based on the receiving.

Some examples of the method, apparatuses, and non-transitory computer-readable medium described herein may further include operations, features, means, or instructions for reducing a feedback frequency for communications with the C-UE based on determining that the C-UE and the V-UE may be co-located.

Some examples of the method, apparatuses, and non-transitory computer-readable medium described herein may further include operations, features, means, or instructions for reducing a SRS frequency for communications with the C-UE based on determining that the C-UE and the V-UE may be co-located.

Some examples of the method, apparatuses, and non-transitory computer-readable medium described herein may further include operations, features, means, or instructions for configuring a period for periodic feedback messages or periodic SRS based on determining that the C-UE and the V-UE may be co-located.

Some examples of the method, apparatuses, and non-transitory computer-readable medium described herein may further include operations, features, means, or instructions for determining a downlink transmission beam direction or a downlink transmission beam codebook for communicating with the C-UE or the V-UE, or both, based on determining that the V-UE and the C-UE may be co-located.

In some examples of the method, apparatuses, and non-transitory computer-readable medium described herein, the positioning information of the V-UE includes one or more of location information, trajectory information, or a combination thereof.

A method for wireless communications at a sidelink wireless device is described. The method may include receiving positioning information of a V-UE in communication with the sidelink wireless device over a sidelink communications link and transmitting, to a base station co-located with the sidelink wireless device, an indication of the positioning information of the V-UE.

An apparatus for wireless communications at a sidelink wireless device is described. The apparatus may include a processor, memory coupled with the processor, and instructions stored in the memory. The instructions may be executable by the processor to cause the apparatus to receive positioning information of a V-UE in communication with the sidelink wireless device over a sidelink communications link and transmit, to a base station co-located with the sidelink wireless device, an indication of the positioning information of the V-UE.

Another apparatus for wireless communications at a sidelink wireless device is described. The apparatus may include means for receiving positioning information of a V-UE in communication with the sidelink wireless device over a sidelink communications link and means for transmitting, to a base station co-located with the sidelink wireless device, an indication of the positioning information of the V-UE.

A non-transitory computer-readable medium storing code for wireless communications at a sidelink wireless device is described. The code may include instructions executable by a processor to receive positioning information of a V-UE in communication with the sidelink wireless device over a sidelink communications link and transmit, to a base station co-located with the sidelink wireless device, an indication of the positioning information of the V-UE.

In some examples of the method, apparatuses, and non-transitory computer-readable medium described herein, determining positioning information of the V-UE may include operations, features, means, or instructions for receiving sidelink signaling from the V-UE, where the positioning information may be based on the sidelink signaling, where the positioning information includes a location of the V-UE, a speed of the V-UE, a trajectory of the V-UE, or any combination thereof.

DETAILED DESCRIPTION

Figure 1:
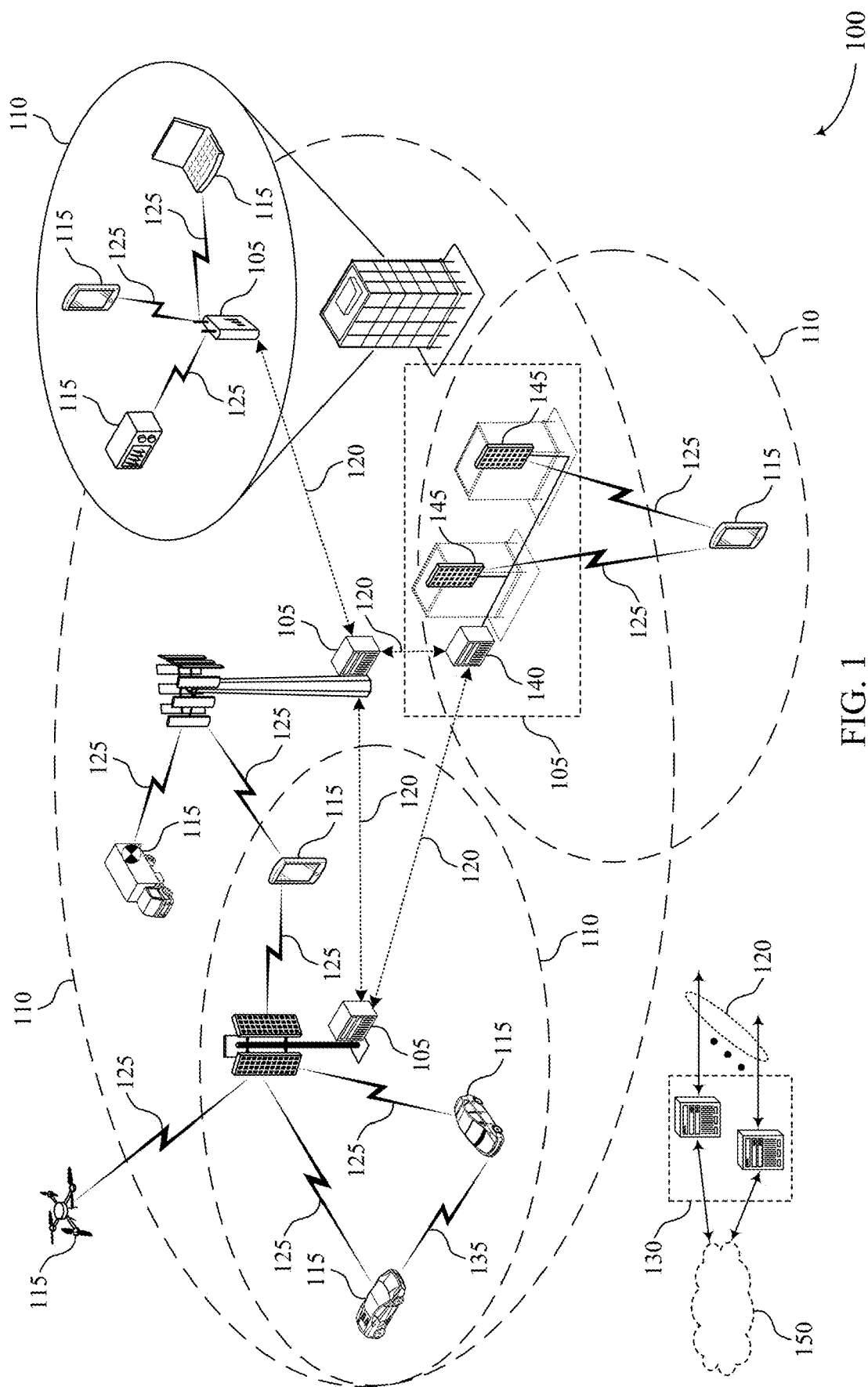
FIG. 1 illustrates an example of a wireless communications system that supports vehicular and cellular wireless device colocation using uplink communications in accordance with aspects of the present disclosure.

Wireless communications systems may include different types of communication devices, which may operate according to different procedures. The communication devices may also communicate within different communication channels. Some communication devices may include user equipments (UEs) and base stations. In many cases, UEs and base stations may communicate using a Uu or cellular communications link. In these cases, a UE may transmit uplink communications to a base station, and may receive downlink communications from the base station. A UE that communicates with a base station using a Uu communications link may be an example of a cellular UE (C-UE).

In some cases, UEs and other devices may also communicate using a sidelink communications system. UEs may communicate with other UEs over sidelink channel, by transmitting and receiving sidelink messages. Some UEs may be vehicle UEs (V-UEs), which may be associated with vehicles. V-UEs may communicate with C-UEs over sidelink channels. V-UEs and other UEs may also communicate with other sidelink devices, such as road-side units (RSUs). Sidelink communications may be an example of one radio access technology (RAT), while Uu communications may be an example of a different RAT.

In some cases, RSUs may be co-located with a base station. The RSU may also communicate directly with the base station. Thus, a RSU may communicate with a V-UE, or a C-UE, or both, and the RSU may communicate information about the devices to the base station. For example, the base station may communicate with a C-UE, but the base station may not be in communication with a V-UE, which may also be in the service area of the base station or near the C-UE. However, the RSU may receive sidelink signaling from the V-UE, and may communicate information about the V-UE to the base station.

In some cases, C-UEs and V-UEs may be co-located. For example, a C-UE may be located within a vehicle associated with a V-UE. In these cases, the C-UE and V-UE may have the same or similar travel speeds, locations, and trajectories. A base station may receive signaling from the C-UE, but not the V-UE, and thus, the base station may not be aware that the C-UE and the V-UE are co-located. However, the RSU may receive sidelink signaling from the V-UE. Based on the signaling, the RSU may determine positioning information, including location, speed, path, and angle of arrival (AoA) information of the V-UE.

The base station may also communicate information about the C-UE to the RSU. For example, the base station may communicate positioning information received from the C-UE to the RSU. Therefore, the RSU may have received an indication of positioning information of both the C-UE and the V-UE. Based on the positioning information of the V-UE and the C-UE, the RSU may determine that the V-UE and the C-UE are co-located. The RSU may indicate this co-location to the base station.

In another case, the RSU may communicate positioning information of the V-UE to the base station. Therefore, the base station may have received an indication of positioning information of both the C-UE and the V-UE. Based on the positioning information of the V-UE and the C-UE, the base station may determine that the V-UE and the C-UE are co-located.

Based on determining that the V-UE and C-UE are co-located, or based on receiving an indication thereof from the RSU, the base station may perform the downlink communications to the C-UE. The base station may perform the communications based on positioning information of the co-located V-UE, including changing communication parameters. For example, the base station may perform beam management and beamforming to the C-UE, based on positioning information of the V-UE. The base station may thus improve communications with the C-UE, based on sidelink information from a V-UE received at a RSU co-located with the base station.

Aspects of the disclosure are initially described in the context of wireless Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to vehicular and cellular wireless device colocation using uplink communications.

FIG. 1 illustrates an example of a wireless communications system 100 that supports vehicular and cellular wireless device colocation using uplink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105, may be co-located with a sidelink wireless device, such as a RSU. The base station 105 may determine that a C-UE 115 and a V-UE 115 are co-located, may alter downlink communications to the C-UE 115. The RSU may communicate over sidelink with a V-UE 115, and determine positioning information of a V-UE 115. The base station 105 may communicate with a C-UE 115 using downlink and uplink communications (e.g., Uu communications), and may determine some positioning information of the C-UE 115. The base station 105 and RSU may communicate the positioning information of each device, and the base station 105 may determine that the C-UE 115 and V-UE 115 are co-located. The base station 105 may alter a feedback configuration for the C-UE 115 based on the co-location.

Figure 2:
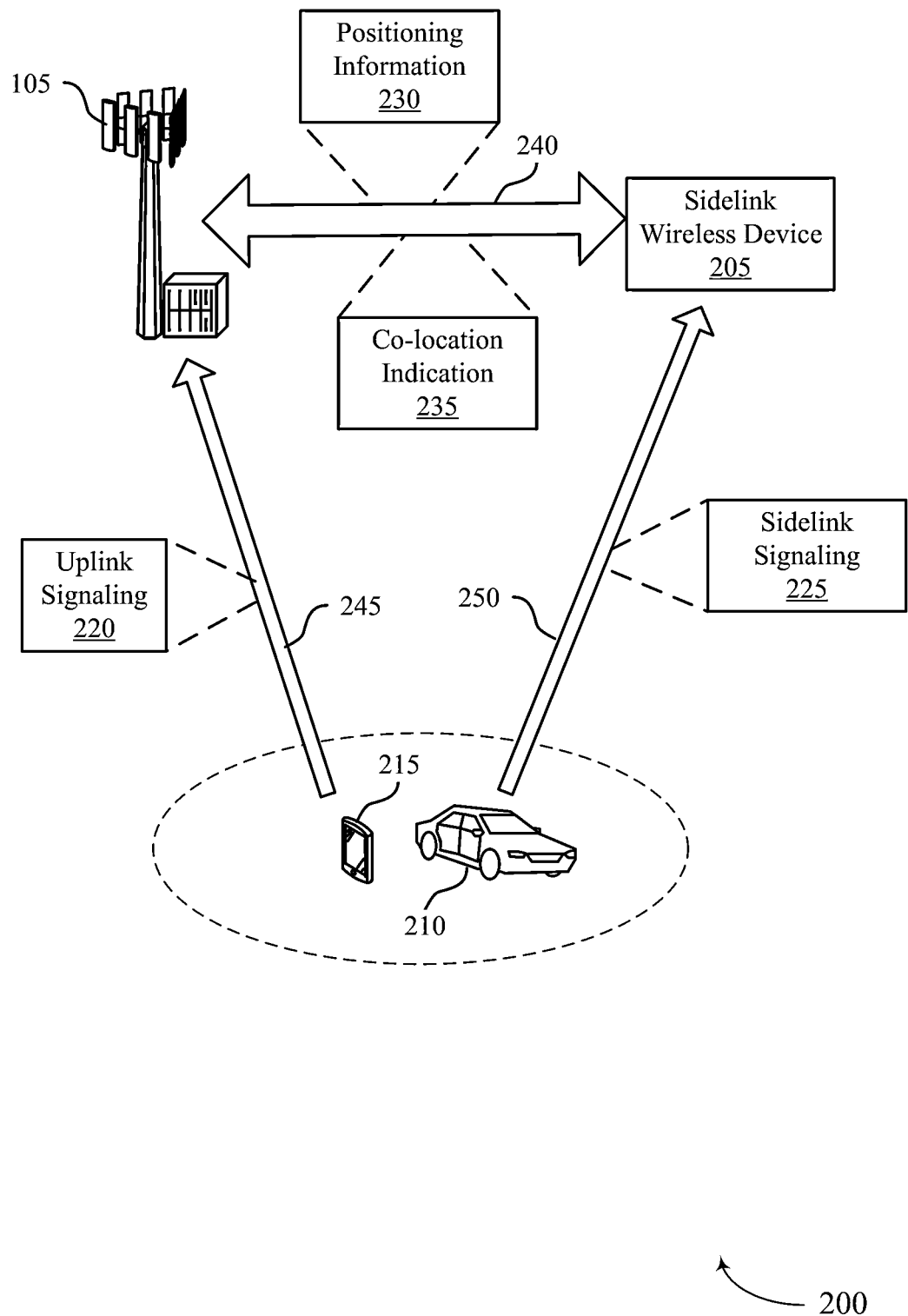
FIG. 2 illustrates an example of a wireless communications system that supports vehicular and cellular wireless device colocation using uplink communications in accordance with aspects of the present disclosure.

FIG. 2 illustrates an example of a wireless communications system 200 that supports vehicular and cellular wireless device colocation using uplink communications in accordance with aspects of the present disclosure. Wireless communications system 200 includes base station 105, which may be an example of a base station 105 as described with reference to FIG. 1. Wireless communications system 200 also includes C-UE 215, which may be an example of a UE 115 as described with respect to FIG. 1. Wireless communications system 200 also includes a V-UE 210. V-UE 210 and C-UE 215 may be co-located. For example, C-UE 215 may be located within a vehicle corresponding to V-UE 210. Sidelink wireless device 205 may be an example of a RSU. Sidelink wireless device 205 and base station 105 may be co-located.

C-UE 215 may communicate with base station 105 over communications channel 245. Communications channel 245 may be an example of a cellular link or a Uu link. V-UE 210 may communicate with sidelink wireless device 205 over sidelink communications channel 250. V-UE 210 may transmit and receive sidelink communications to and from sidelink wireless device 205. Sidelink wireless device 205 may communicate with base station 105 using communications channel 240.

Base station 105 may determine positioning information of C-UE 215 based on physical layer measurements. Base station 105 and C-UE 215 may communicate over communications channel 245. Base station 105 may transmit downlink communications to C-UE 215 using a set of beams. Based on C-UE 215 feedback transmissions responsive to beamforming downlink transmissions, base station 105 may derive positioning information of C-UE 215. For example, C-UE 215 may respond to downlink communications of one or more beams of a set of base station 105 beams. The communications and beams that C-UE 215 responds to may be associated with a direction. Base station 105 may thus determine some positioning information of C-UE 215 based on C-UE 215 feedback transmissions.

In other communications with base station 105, C-UE 215 may transmit SRS (SRS) transmissions. Base station 105 may receive SRS transmissions from C-UE 215. Base station 105 may estimate AoA parameters of the SRS transmission from C-UE 215, and base station 105 may thus be able to determine some positioning information of C-UE 215, including location or trajectory information, or both.

In other examples, C-UE 215 may be capable of Uu positioning. In these cases, base station 105 may determine location or trajectory information, or both, of C-UE 215, based on Uu positioning. For example, C-UE 215 may report location information of C-UE 215 to base station 105. In these cases, C-UE 215 may be equipped with global navigation satellite system (GNSS) capability. In some cases, base station 105 may transmit a request for the location information of C-UE 215.

Sidelink wireless device 205 may determine positioning information of V-UE 210 based on sidelink signaling 225 in sidelink channel 250. For example, V-UE 210 may transmit sidelink signaling 225 to sidelink wireless device 205. The sidelink signaling 225 may include V2X messages from V-UE 210. The sidelink signaling 225 may include an indication of positioning information of V-UE 210. The positioning information may include location or trajectory information, or both.

In some examples, base station 105 may transmit positioning information 230 to sidelink wireless device 205 in communications channel 240. Positioning information 230 from base station 105 may include an indication of positioning information of C-UE 215. In these cases, sidelink wireless device 205 may receive positioning information 230 of C-UE 215. Sidelink wireless device 205 may then determine whether C-UE 215 and V-UE 210 are co-located, based on the positioning information 230 of C-UE 215 received from base station 105 and the positioning information determine about V-UE 210. For example, sidelink wireless device 205 may compare location information and trajectory information of C-UE 215 and V-UE 210. Sidelink wireless device 210 may determine whether C-UE 215 and V-UE 210 have a same or similar location, or if C-UE 215 and V-UE 210 have a same or similar trajectory for a threshold amount of time. For example, sidelink wireless device 205 may determine that C-UE 215 and V-UE 210 have an overlapping trajectory for a threshold amount of time.

In cases where C-UE 215 and V-UE 210 are co-located, sidelink wireless device 205 may transmit co-location indication 235. Co-location indication 235 may indicate that C-UE 215 and V-UE 210 are co-located. Sidelink wireless device 205 may also transmit an indication of the positioning information of the V-UE 210, including application layer information of the V-UE 210.

In other examples, sidelink wireless device 205 may transmit an indication of the positioning information 230 of V-UE 210 to base station 105 in communications channel 240. Base station 105 may receive positioning information 230 of V-UE 210, and base station 105 may determine whether C-UE 215 and V-UE 210 have a matching location, or an overlapping trajectory for a threshold amount of time, or both. In some cases, there may be more than one C-UE 215, and base station 105 may determine which C-UE 215 is associated with V-UE 210, or if multiple C-UEs 215 are associated with V-UE 210 (e.g., a vehicle with multiple passengers along with multiple C-UEs 215).

Based on receiving co-location indication 235, or determining the co-location based on positioning information 230 of V-UE 210 received from sidelink unit 205, base station 105 may adjust downlink communications to C-UE 215 in communications channel 245.

For example, base station 105 may reduce, increase, or change a feedback frequency for C-UE 215. C-UE 215 may thus transmit beam feedback for beam management procedures based on the updated frequency. Base station 105 may also reduce, increase, or change a SRS transmission frequency for C-UE 215. C-UE 215 may transmit SRS messages in uplink signaling 220 in communications channel 245 according to the updated frequency.

For example, base station 205 may configure a different period value for periodical feedback from C-UE 215, or for periodical SRS transmissions from C-UE 215. Base station 105 may also trigger feedback or SRS transmissions from C-UE 215 less frequency, or temporarily disable the feedback transmissions or SRS transmissions.

Base station 105 may rely on beam management procedures and SRS transmissions from C-UE 215 to determine downlink transmission beam directions or codebooks, or both. Once base station 105 determines that C-UE 215 and V-UE 210 are associated (e.g., co-located), base station 105 may determine downlink transmission beams or codebooks based on the location or trajectory of V-UE 210 provided by sidelink wireless device 205. Base station 105 may thus change feedback or SRS frequencies to reduce signaling overhead in Uu communications to C-UE 215 to improve performance.

In some cases, sidelink wireless device 205 may indicate to base station 105 an accuracy level of the location information of V-UE 210. The accuracy level may be based on sidelink wireless device 205 being aware that location scrambling may be used for the location information of V-UE 210. In another case, V-UE 210 may indicate the accuracy level to sidelink wireless device 205. The accuracy level indicated by V-UE 210 may be based on available regulation information, or based on GNSS information of V-UE 210 or a positioning implementation of V-UE 210.

Figure 3:
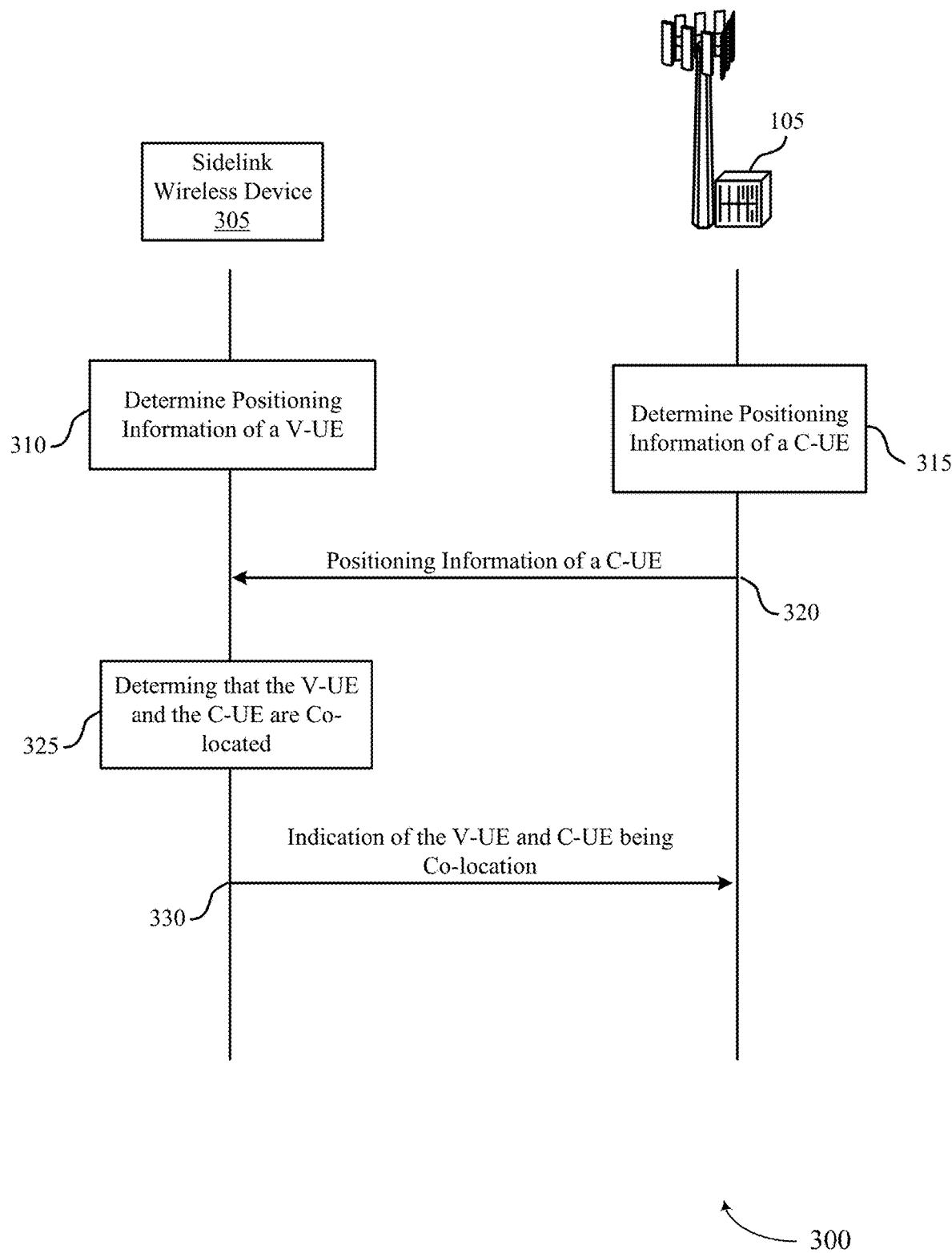
FIG. 3 illustrates an example of a process flow that supports vehicular and cellular wireless device colocation using uplink communications in accordance with aspects of the present disclosure.

FIG. 3 illustrates an example of a process flow 300 that supports vehicular and cellular wireless device colocation using uplink communications in accordance with aspects of the present disclosure. Process flow 300 includes sidelink wireless device 305, which may be an example of sidelink wireless device 205 as described with respect to FIG. 2. Sidelink wireless device 405 may be an example of a RSU co-located with base station 105. Base station 105 may be an example of a base station 105 as described with respect to FIGS. 1 and 2.

At 310, sidelink wireless device 305 may determine positioning information of a V-UE in communication with the sidelink wireless device 305 over a sidelink communications link. For example, sidelink wireless device 305 may receive positioning information of a V-UE in communication with the sidelink wireless device 305 over a sidelink communications link. Sidelink wireless device 305 may receive sidelink signaling from the V-UE, and may determining the positioning information of the V-UE based on the sidelink signaling. the positioning information may include a location of the V-UE, a speed of the V-UE, a trajectory of the V-UE, or a combination thereof.

At 315, base station 105 may determine positioning information of a C-UE. For example, base station 105 may receive positioning information of a C-UE. Base station 105 may receive a feedback message from the C-UE, where the feedback message corresponds to a downlink beam direction to be used for a downlink transmission to the C-UE. Base station 105 may also receive a SRS from the C-UE, and may determine the positioning information based on the SRS. In some cases, base station 105 may estimate an AoA parameter of the SRS, and the base station may determine the positioning information of the C-UE based on the AoA parameter.

In some cases, base station 105 may receive an indication of the positioning information from the C-UE via Uu communications between the base station 105 and the C-UE. The base station 105 may determine the positioning information of the C-UE based on the indication of the positioning information. In some cases, base station 105 may receive positioning information of a V-UE from the sidelink wireless device 205.

At 320, sidelink wireless device 305 may receive, from base station 105, positioning information of a C-UE in communication with the base station 105.

At 325, sidelink wireless device 305 may determine that the C-UE and the V-UE are co-located based on the positioning information of the V-UE and the positioning information of the C-UE. Sidelink wireless device 305 may determine that the positioning information of the C-UE and the positioning information of the V-UE include a same location, at least a partially overlapping trajectory, at least a partially overlapping trajectory for a threshold period of time, or a combination of these.

At 330, sidelink wireless device 305 may transmit, to base station 105, an indication of the V-UE and the C-UE being co-located based on the determining. In some cases, sidelink wireless device 305 may transmit application layer information of the V-UE to the base station 105. The application layer information may include one or more of location information of the V-UE, speed information of the V-UE, trajectory information of the V-UE, or a combination of these.

Base station 105 may reduce a feedback frequency for communications with the C-UE based on determining that the C-UE and the V-UE are co-located (e.g., based on receiving the indication at 330). Base station 105 may also reduce a SRS frequency for communications with the C-UE based on determining that the C-UE and the V-UE are co-located. base station 105 may configure a period for periodic feedback messages or periodic SRSs based on determining that the C-UE and the V-UE are co-located. Base station 105 may also determine a downlink transmission beam direction or a downlink transmission beam codebook for communication with the C-UE or the V-UE, or both, based on determining that the V-UE and the C-UE are co-located.

Figure 4:
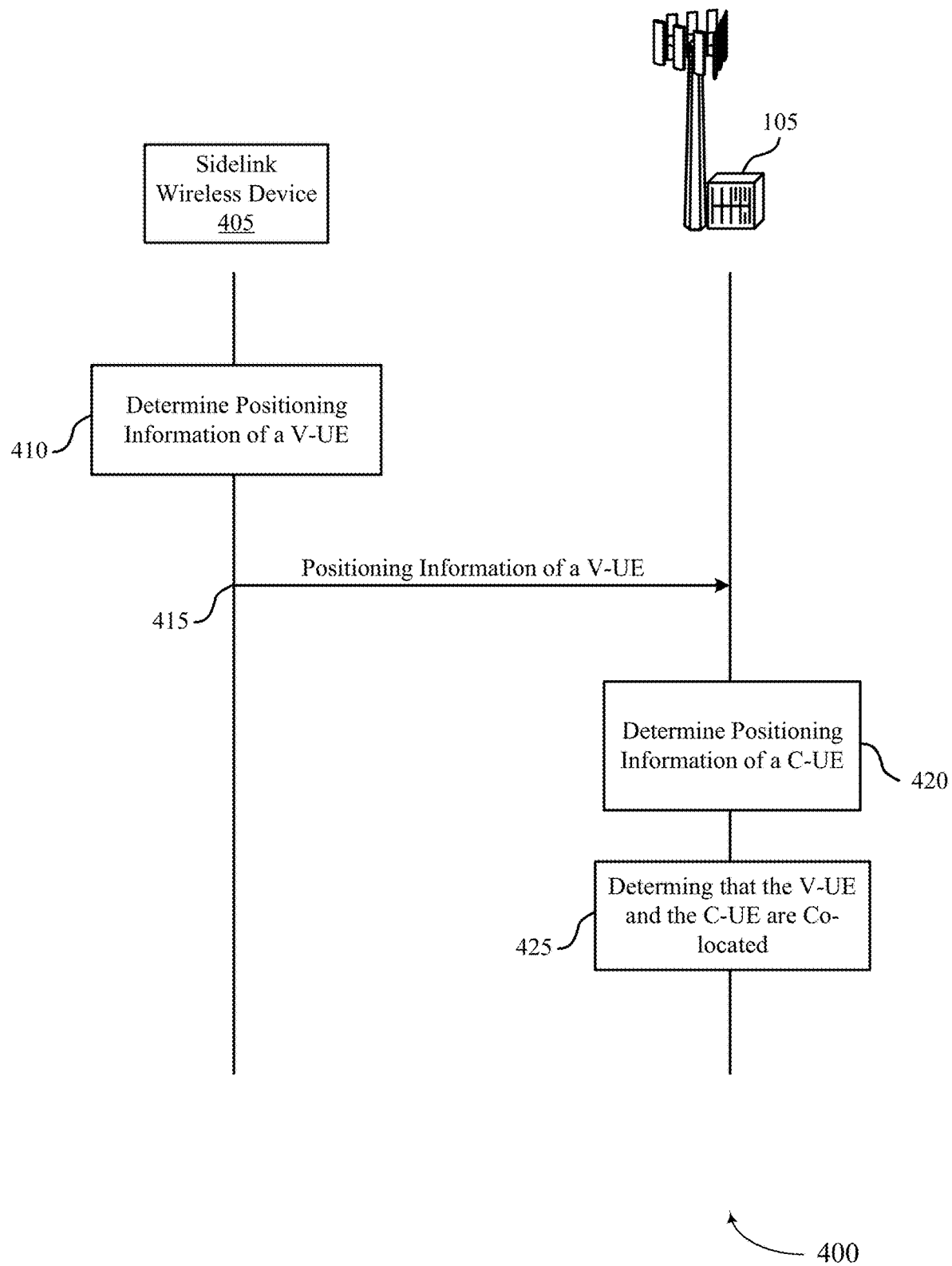
FIG. 4 illustrates an example of a process flow that supports vehicular and cellular wireless device colocation using uplink communications in accordance with aspects of the present disclosure.

FIG. 4 illustrates an example of a process flow 400 that supports vehicular and cellular wireless device colocation using uplink communications in accordance with aspects of the present disclosure. Process flow 400 includes sidelink wireless device 405, which may be an example of sidelink wireless device 205 as described with respect to FIGS. 2 and 3. Sidelink wireless device 405 may be an example of a RSU co-located with base station 105. Base station 105 may be an example of a base station 105 as described with respect to FIGS. 1, 2, and 3.

At 410, sidelink wireless device 405 may determine positioning information of a V-UE in communication with the sidelink wireless device over a sidelink communications link. For example, sidelink wireless device 405 may receive positioning information of a V-UE in communication with the sidelink wireless device 405 over a sidelink communications link. Sidelink wireless device 405 may receive sidelink signaling from the V-UE, and may determine the positioning information of the V0UE based on the sidelink signaling. The positioning information may include a location of the V-UE, a speed of the V-UE, a trajectory of the V-UE, or a combination of these.

At 415, sidelink wireless device 405 may transmit, to base station 105 co-located with the sidelink wireless device 405, an indication of the positioning information of the V-UE.

At 420, base station 105 may determining positioning information of a C-UE. For example, base station 105 may receive positioning information of a C-UE. Base station 105 may receive a feedback message from the C-UE, where the feedback message corresponds to a downlink beam direction to be used for a downlink transmission to the C-UE. Base station 105 may also receive a SRS from the C-UE, and may determine the positioning information based on the SRS. In some cases, base station 105 may estimate an AoA parameter of the SRS, and the base station may determine the positioning information of the C-UE based on the AoA parameter.

In some cases, base station 105 may receive an indication of the positioning information from the C-UE via Uu communications between the base station 105 and the C-UE. The base station 105 may determine the positioning information of the C-UE based on the indication of the positioning information. In some cases, base station 105 may receive positioning information of a V-UE from the sidelink wireless device 205. Base station 105 may determine the positioning information of the V-UE based on receiving the positioning information of the V-UE.

At 425, base station 105 may determine that the C-UE and the V-UE are co-located based on the positioning information of the V-UE and the positioning information of the C-UE. Base station 105 may reduce a feedback frequency for communications with the C-UE based on determining that the C-UE and the V-UE are co-located (e.g., based on receiving the indication at 330). Base station 105 may also reduce a SRS frequency for communications with the C-UE based on determining that the C-UE and the V-UE are co-located. base station 105 may configure a period for periodic feedback messages or periodic SRSs based on determining that the C-UE and the V-UE are co-located. Base station 105 may also determine a downlink transmission beam direction or a downlink transmission beam codebook for communication with the C-UE or the V-UE, or both, based on determining that the V-UE and the C-UE are co-located.

Figure 5:
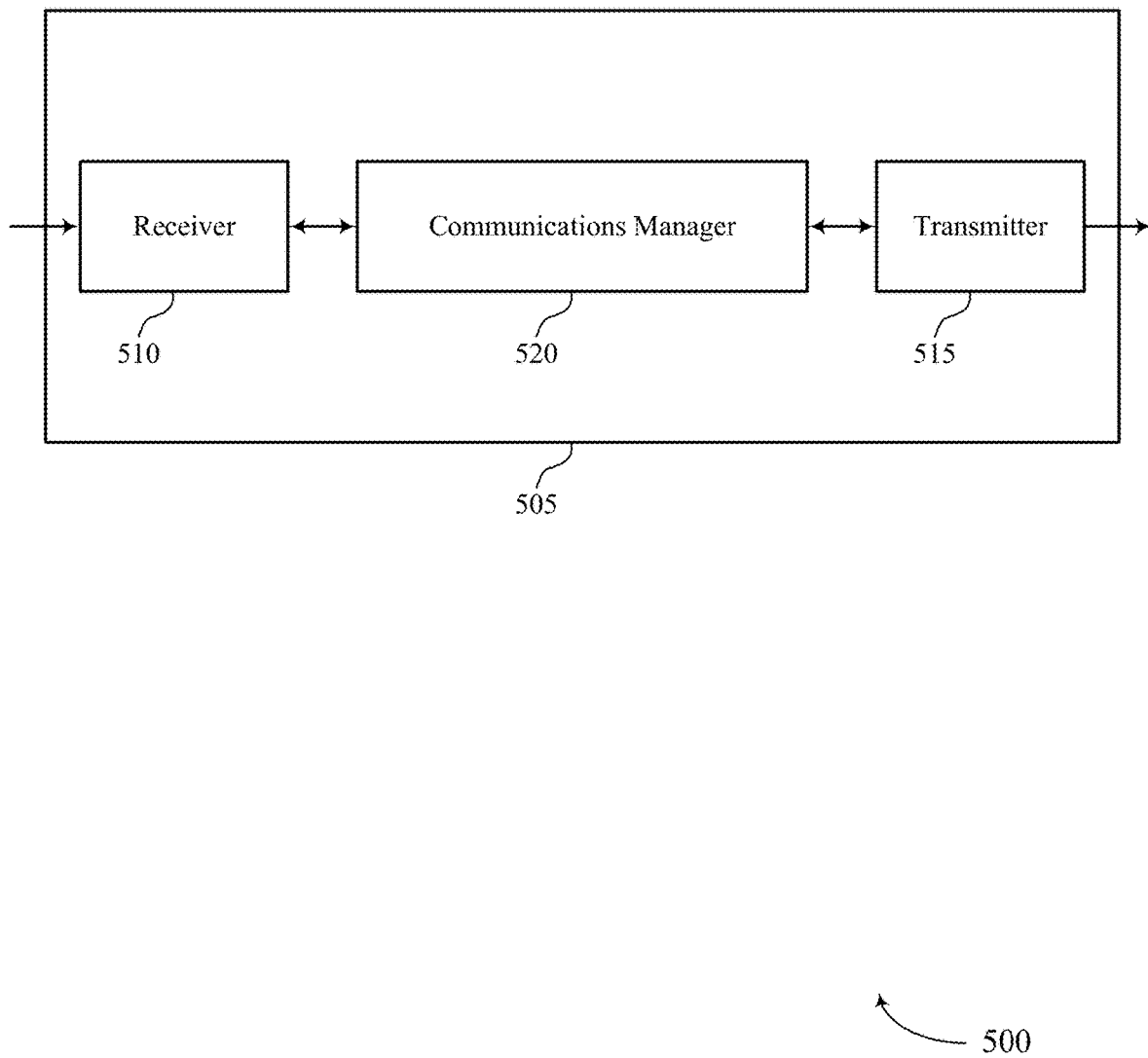
FIGS. 5 and 6 show block diagrams of devices that support vehicular and cellular wireless device colocation using uplink communications in accordance with aspects of the present disclosure.

FIG. 5 shows a block diagram 500 of a device 505 that supports vehicular and cellular wireless device colocation using uplink communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to vehicular and cellular wireless device colocation using uplink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to vehicular and cellular wireless device colocation using uplink communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of vehicular and cellular wireless device colocation using uplink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a sidelink wireless device in accordance with examples as disclosed herein. For example, the communications manager 520 may be configured as or otherwise support a means for receiving positioning information of a vehicle UE in communication with the sidelink wireless device over a sidelink communications link. The communications manager 520 may be configured as or otherwise support a means for receiving, from a base station co-located with the sidelink wireless device, positioning information of a cellular UE in communication with the base station. The communications manager 520 may be configured as or otherwise support a means for determining that the cellular UE and the vehicle UE are co-located based on the positioning information of the vehicle UE and the positioning information of the cellular UE. The communications manager 520 may be configured as or otherwise support a means for transmitting, to the base station, an indication of the vehicle UE and the cellular UE being co-located based on the determining.

Additionally or alternatively, the communications manager 520 may support wireless communications at a sidelink wireless device in accordance with examples as disclosed herein. For example, the communications manager 520 may be configured as or otherwise support a means for receiving positioning information of a vehicle UE in communication with the sidelink wireless device over a sidelink communications link. The communications manager 520 may be configured as or otherwise support a means for transmitting, to a base station co-located with the sidelink wireless device, an indication of the positioning information of the vehicle UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a sidelink wireless device aiding in improving efficiency in communication at a base station. The device 505 may operate the transmitter 515 to provide positioning and co-location indications to a base station 105, such that the base station may improve communications with UEs 115 based on signaling from the device 505.

Figure 6:
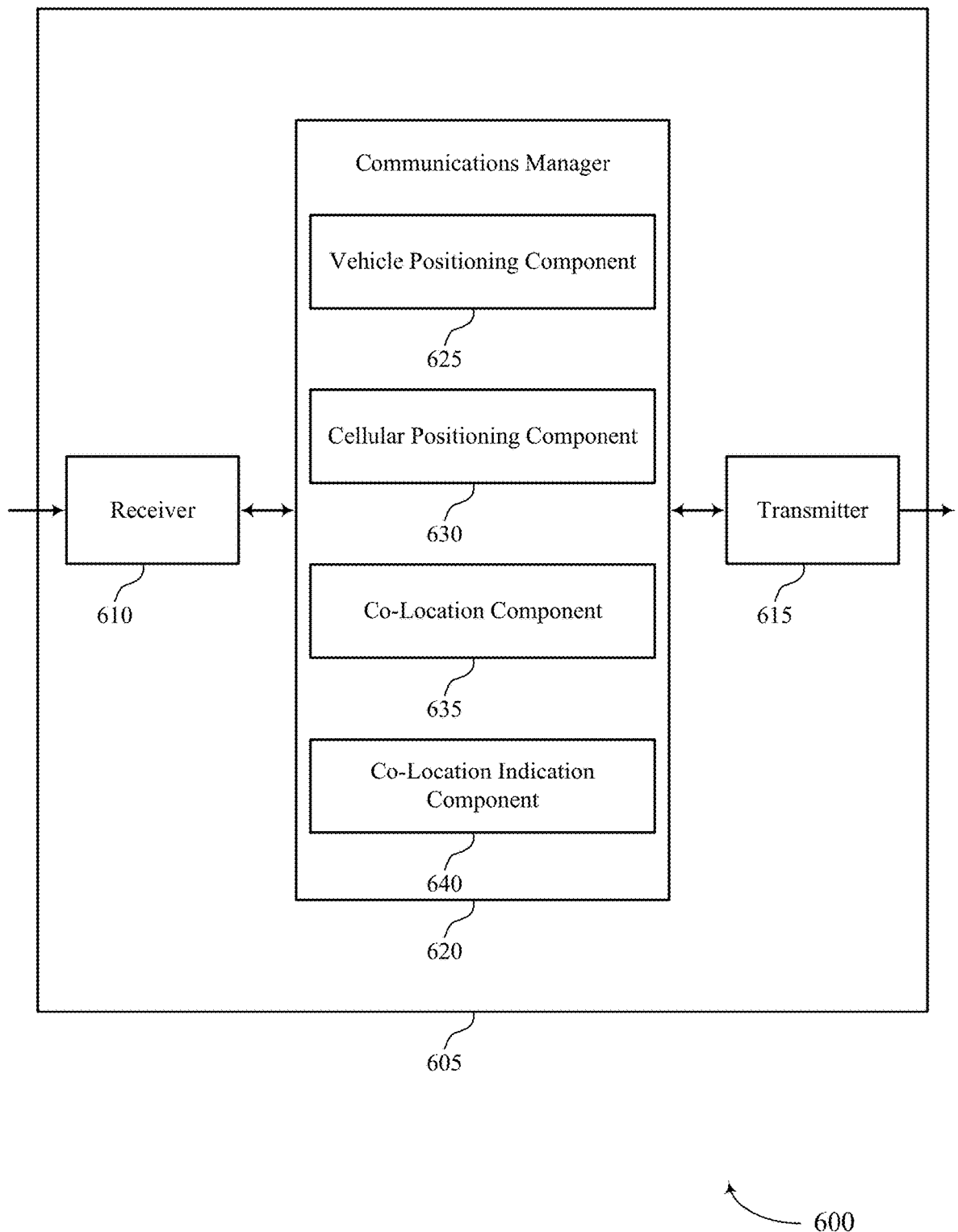

FIG. 6 shows a block diagram 600 of a device 605 that supports vehicular and cellular wireless device colocation using uplink communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to vehicular and cellular wireless device colocation using uplink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to vehicular and cellular wireless device colocation using uplink communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of vehicular and cellular wireless device colocation using uplink communications as described herein. For example, the communications manager 620 may include a vehicle positioning component 625, a cellular positioning component 630, a co-location component 635, a co-location indication component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a sidelink wireless device in accordance with examples as disclosed herein. The vehicle positioning component 625 may be configured as or otherwise support a means for receiving positioning information of a vehicle UE in communication with the sidelink wireless device over a sidelink communications link. The cellular positioning component 630 may be configured as or otherwise support a means for receiving, from a base station co-located with the sidelink wireless device, positioning information of a cellular UE in communication with the base station. The co-location component 635 may be configured as or otherwise support a means for determining that the cellular UE and the vehicle UE are co-located based on the positioning information of the vehicle UE and the positioning information of the cellular UE. The co-location indication component 640 may be configured as or otherwise support a means for transmitting, to the base station, an indication of the vehicle UE and the cellular UE being co-located based on the determining.

Additionally or alternatively, the communications manager 620 may support wireless communications at a sidelink wireless device in accordance with examples as disclosed herein. The vehicle positioning component 625 may be configured as or otherwise support a means for receiving positioning information of a vehicle UE in communication with the sidelink wireless device over a sidelink communications link. The co-location indication component 640 may be configured as or otherwise support a means for transmitting, to a base station co-located with the sidelink wireless device, an indication of the positioning information of the vehicle UE.

Figure 7:
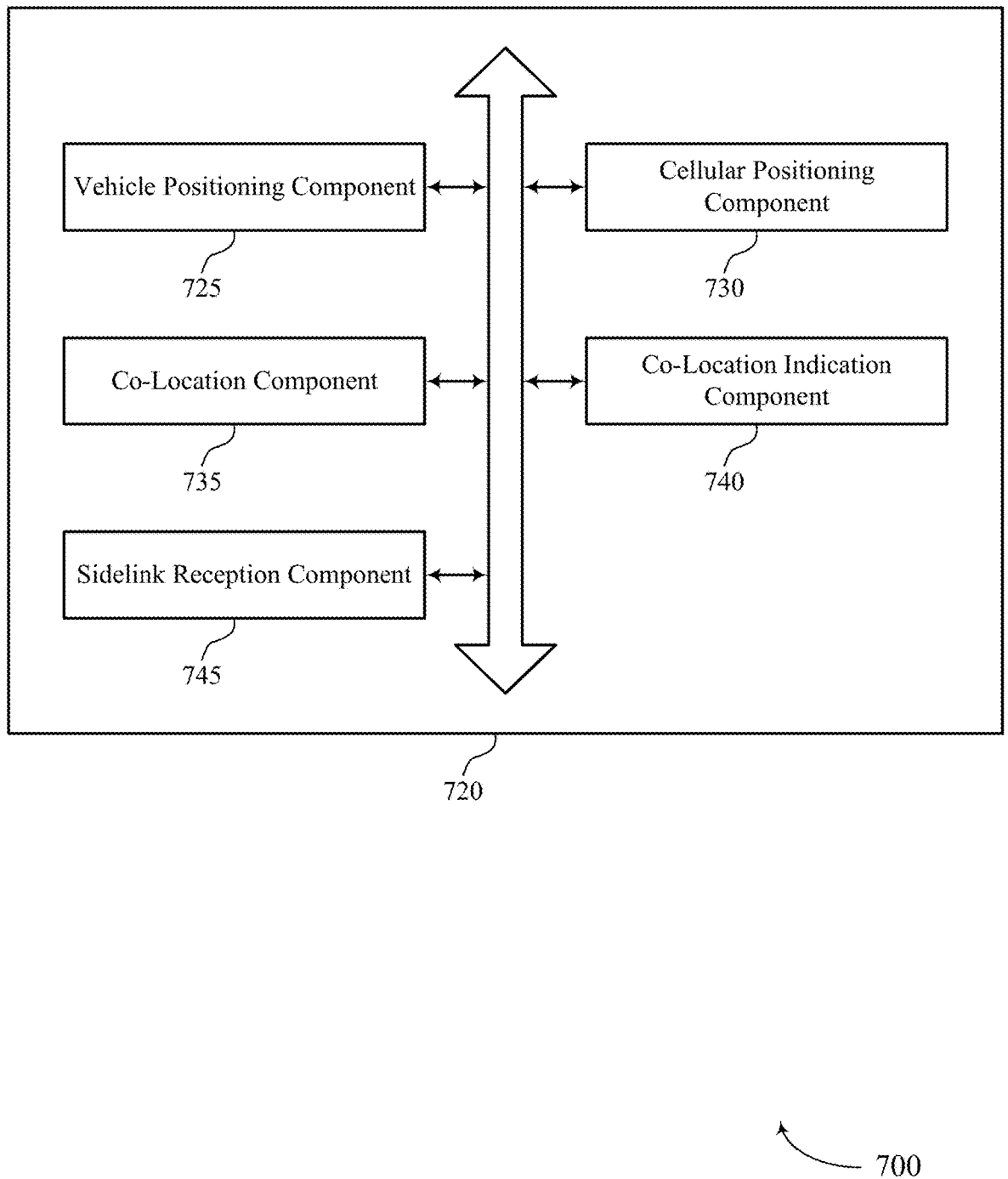
FIG. 7 shows a block diagram of a communications manager that supports vehicular and cellular wireless device colocation using uplink communications in accordance with aspects of the present disclosure.

FIG. 7 shows a block diagram 700 of a communications manager 720 that supports vehicular and cellular wireless device colocation using uplink communications in accordance with aspects of the present disclosure. The communications manager 720 may be an example of aspects of a communications manager 520, a communications manager 620, or both, as described herein. The communications manager 720, or various components thereof, may be an example of means for performing various aspects of vehicular and cellular wireless device colocation using uplink communications as described herein. For example, the communications manager 720 may include a vehicle positioning component 725, a cellular positioning component 730, a co-location component 735, a co-location indication component 740, a sidelink reception component 745, or any combination thereof. Each of these components may communicate, directly or indirectly, with one another (e.g., via one or more buses).

The communications manager 720 may support wireless communications at a sidelink wireless device in accordance with examples as disclosed herein. The vehicle positioning component 725 may be configured as or otherwise support a means for receiving positioning information of a vehicle UE in communication with the sidelink wireless device over a sidelink communications link. The cellular positioning component 730 may be configured as or otherwise support a means for receiving, from a base station co-located with the sidelink wireless device, positioning information of a cellular UE in communication with the base station. The co-location component 735 may be configured as or otherwise support a means for determining that the cellular UE and the vehicle UE are co-located based on the positioning information of the vehicle UE and the positioning information of the cellular UE. The co-location indication component 740 may be configured as or otherwise support a means for transmitting, to the base station, an indication of the vehicle UE and the cellular UE being co-located based on the determining.

In some examples, the sidelink reception component 745 may be configured as or otherwise support a means for receiving sidelink signaling from the vehicle UE where the positioning information includes a location of the vehicle UE, a speed of the vehicle UE, a trajectory of the vehicle UE, or any combination thereof, based on the sidelink signaling.

In some examples, to support determining that the cellular UE and the vehicle UE are co-located, the cellular positioning component 730 may be configured as or otherwise support a means for determining that the positioning information of the cellular UE and the positioning information of the vehicle UE includes one or more of a same location, at least a partially overlapping trajectory, at least a partially overlapping trajectory for a threshold period of time, or a combination thereof.

In some examples, the co-location indication component 740 may be configured as or otherwise support a means for transmitting application layer information of the vehicle UE to the base station, the application layer information including one or more of location information of the vehicle UE, speed information of the vehicle UE, trajectory information of the vehicle UE, or a combination thereof.

Additionally or alternatively, the communications manager 720 may support wireless communications at a sidelink wireless device in accordance with examples as disclosed herein. In some examples, the vehicle positioning component 725 may be configured as or otherwise support a means for receiving positioning information of a vehicle UE in communication with the sidelink wireless device over a sidelink communications link. In some examples, the co-location indication component 740 may be configured as or otherwise support a means for transmitting, to a base station co-located with the sidelink wireless device, an indication of the positioning information of the vehicle UE.

In some examples, to support determining positioning information of the vehicle UE, the sidelink reception component 745 may be configured as or otherwise support a means for receiving sidelink signaling from the vehicle UE, where the positioning information is based on the sidelink signaling, where the positioning information includes a location of the vehicle UE, a speed of the vehicle UE, a trajectory of the vehicle UE, or any combination thereof.

Figure 8:
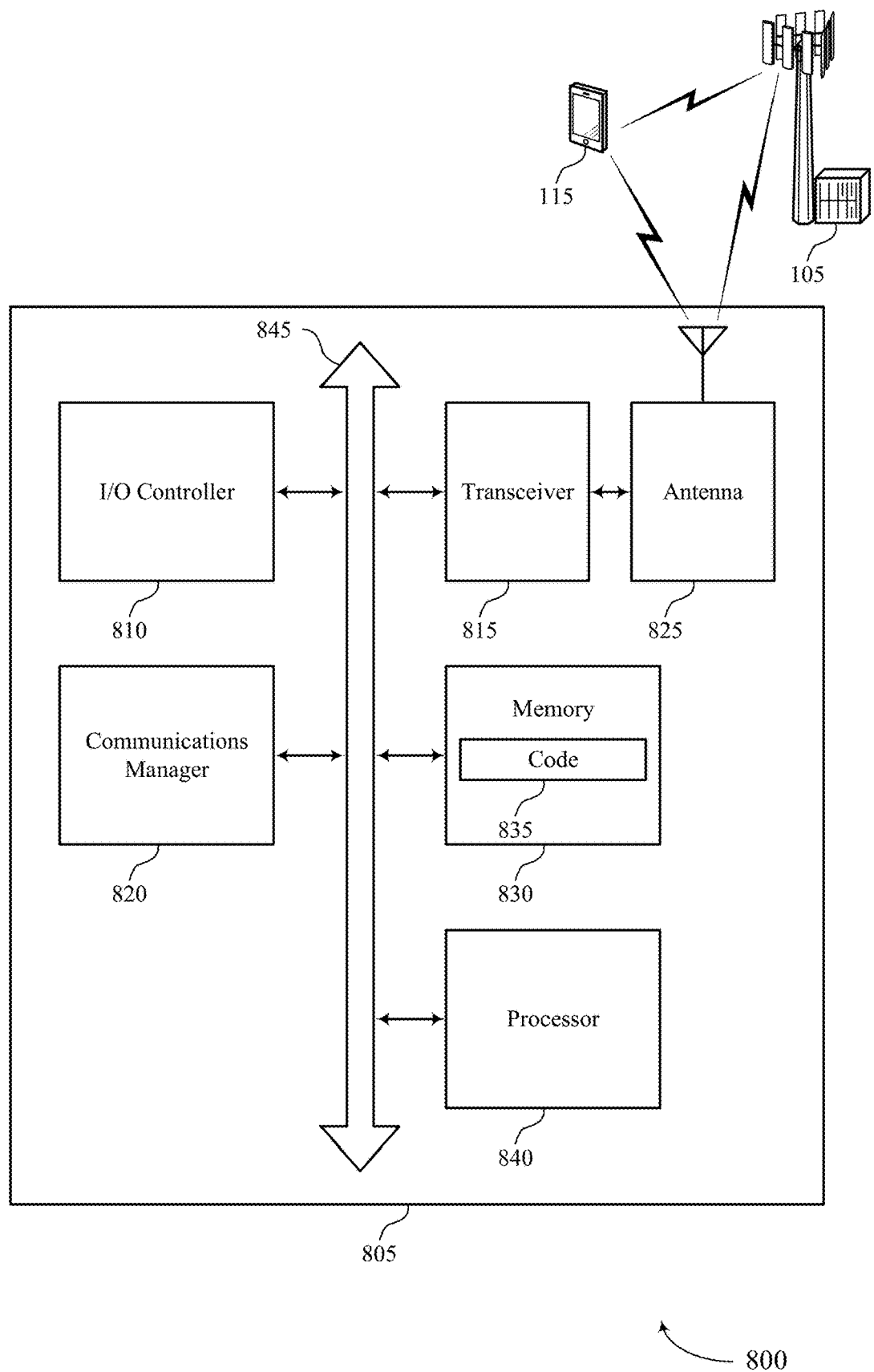
FIG. 8 shows a diagram of a system including a device that supports vehicular and cellular wireless device colocation using uplink communications in accordance with aspects of the present disclosure.

FIG. 8 shows a diagram of a system 800 including a device 805 that supports vehicular and cellular wireless device colocation using uplink communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting vehicular and cellular wireless device colocation using uplink communications). For example, the device 805 or a component of the device 805 may include a processor 840 and memory 830 coupled to the processor 840, the processor 840 and memory 830 configured to perform various functions described herein.

The communications manager 820 may support wireless communications at a sidelink wireless device in accordance with examples as disclosed herein. For example, the communications manager 820 may be configured as or otherwise support a means for receiving positioning information of a vehicle UE in communication with the sidelink wireless device over a sidelink communications link. The communications manager 820 may be configured as or otherwise support a means for receiving, from a base station co-located with the sidelink wireless device, positioning information of a cellular UE in communication with the base station. The communications manager 820 may be configured as or otherwise support a means for determining that the cellular UE and the vehicle UE are co-located based on the positioning information of the vehicle UE and the positioning information of the cellular UE. The communications manager 820 may be configured as or otherwise support a means for transmitting, to the base station, an indication of the vehicle UE and the cellular UE being co-located based on the determining.

Additionally or alternatively, the communications manager 820 may support wireless communications at a sidelink wireless device in accordance with examples as disclosed herein. For example, the communications manager 820 may be configured as or otherwise support a means for receiving positioning information of a vehicle UE in communication with the sidelink wireless device over a sidelink communications link. The communications manager 820 may be configured as or otherwise support a means for transmitting, to a base station co-located with the sidelink wireless device, an indication of the positioning information of the vehicle UE.

By including or configuring the communications manager 820 in accordance with examples as described herein, the device 805 may support techniques for a sidelink wireless device aiding in improving efficiency in communication at a base station. The device 805, including communications manager 820, may to provide positioning and co-location indications to a base station 105, such that the base station may improve communications with UEs 115 based on signaling from the device 805.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of vehicular and cellular wireless device colocation using uplink communications as described herein, or the processor 840 and the memory 830 may be otherwise configured to perform or support such operations.

Figure 9:
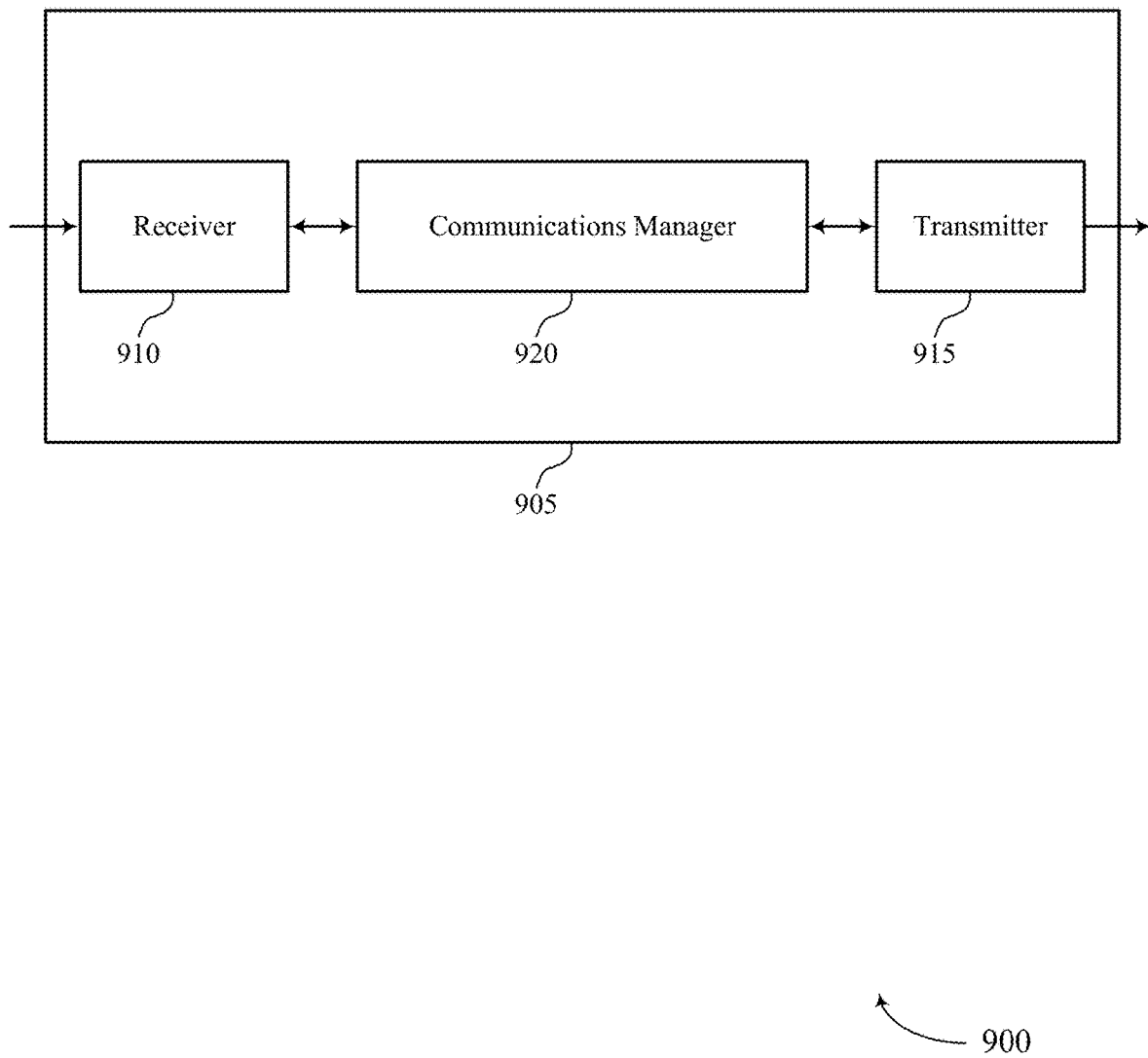
FIGS. 9 and 10 show block diagrams of devices that support vehicular and cellular wireless device colocation using uplink communications in accordance with aspects of the present disclosure.

FIG. 9 shows a block diagram 900 of a device 905 that supports vehicular and cellular wireless device colocation using uplink communications in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to vehicular and cellular wireless device colocation using uplink communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to vehicular and cellular wireless device colocation using uplink communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of vehicular and cellular wireless device colocation using uplink communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving positioning information of a cellular UE. The communications manager 920 may be configured as or otherwise support a means for transmitting the positioning information of the cellular UE to a sidelink wireless device co-located with the base station and in communication with a vehicle UE. The communications manager 920 may be configured as or otherwise support a means for receiving, from the sidelink wireless device, an indication of the vehicle UE and the cellular UE being co-located.

Additionally or alternatively, the communications manager 920 may support wireless communications at a base station in accordance with examples as disclosed herein. For example, the communications manager 920 may be configured as or otherwise support a means for receiving positioning information of a vehicle UE from a sidelink wireless device co-located with the base station and in communication with the vehicle UE. The communications manager 920 may be configured as or otherwise support a means for receiving positioning information of a cellular UE. The communications manager 920 may be configured as or otherwise support a means for determining that the cellular UE and the vehicle UE are co-located based on the positioning information of the vehicle UE and the positioning information of the cellular UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a device 905 (e.g., a base station) determining device co-locations of a V-UE and one or more C-UEs. The device 905 may operate receiver 910 and transmitter 915 to coordinate the co-location determination with a sidelink wireless device (e.g., a RSU). The device 905 may operate the transmitter 915 to provide positioning indications to a sidelink wireless device, and may operate receiver 910 to receive positioning information from a C-UE, or a co-location indication from the sidelink wireless device. The device 905 may then alter communications with UEs 115 based co-location determinations. The device 905 may improve efficiency of communications with the one or more UEs 115.

Figure 10:
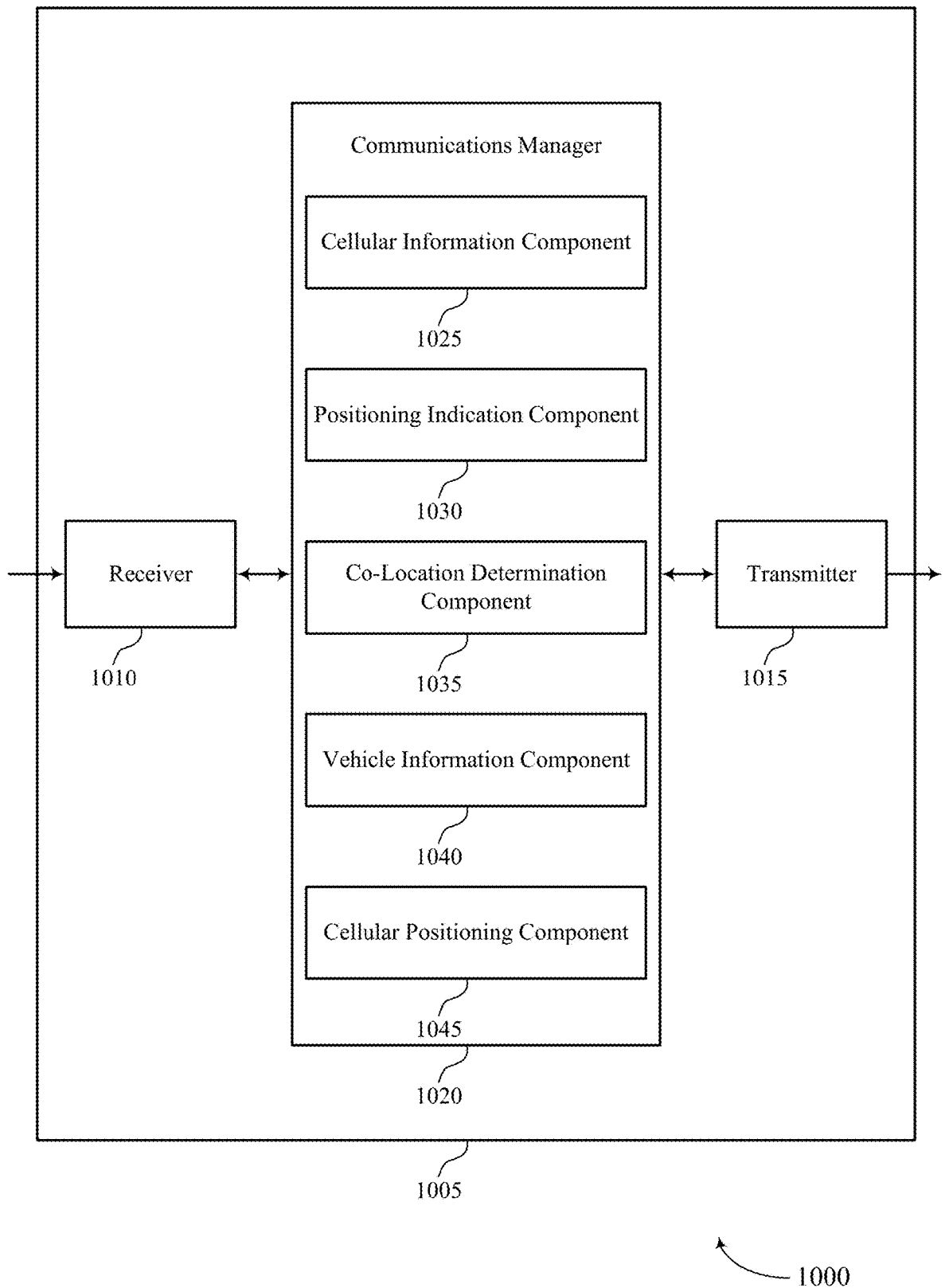

FIG. 10 shows a block diagram 1000 of a device 1005 that supports vehicular and cellular wireless device colocation using uplink communications in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to vehicular and cellular wireless device colocation using uplink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to vehicular and cellular wireless device colocation using uplink communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of vehicular and cellular wireless device colocation using uplink communications as described herein. For example, the communications manager 1020 may include a cellular information component 1025, a positioning indication component 1030, a co-location determination component 1035, a vehicle information component 1040, a cellular positioning component 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The cellular information component 1025 may be configured as or otherwise support a means for receiving positioning information of a cellular UE. The positioning indication component 1030 may be configured as or otherwise support a means for transmitting the positioning information of the cellular UE to a sidelink wireless device co-located with the base station and in communication with a vehicle UE. The co-location determination component 1035 may be configured as or otherwise support a means for receiving, from the sidelink wireless device, an indication of the vehicle UE and the cellular UE being co-located.

Additionally or alternatively, the communications manager 1020 may support wireless communications at a base station in accordance with examples as disclosed herein. The vehicle information component 1040 may be configured as or otherwise support a means for receiving positioning information of a vehicle UE from a sidelink wireless device co-located with the base station and in communication with the vehicle UE. The cellular positioning component 1045 may be configured as or otherwise support a means for receiving positioning information of a cellular UE. The co-location determination component 1035 may be configured as or otherwise support a means for determining that the cellular UE and the vehicle UE are co-located based on the positioning information of the vehicle UE and the positioning information of the cellular UE.

Figure 11:
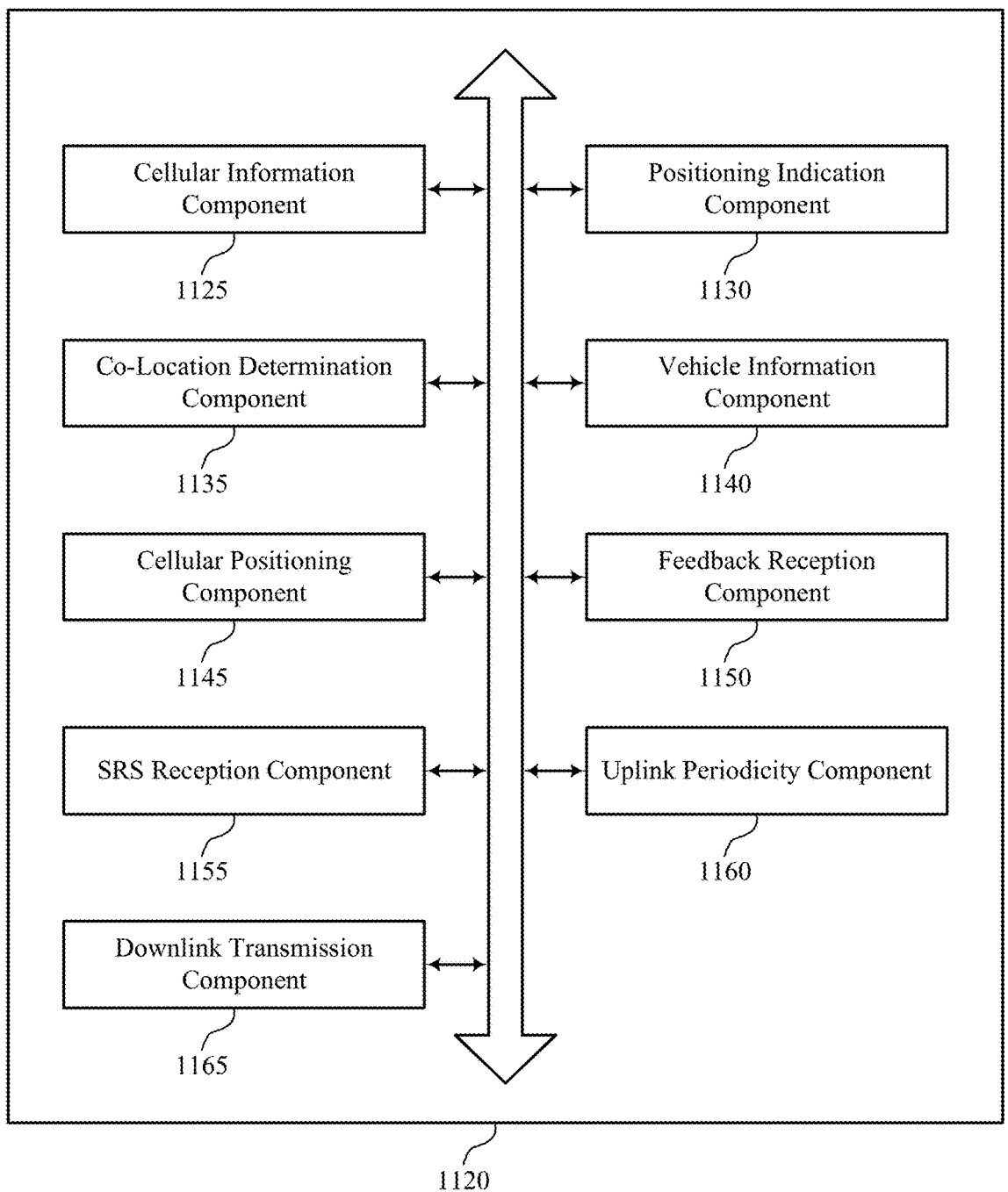
FIG. 11 shows a block diagram of a communications manager that supports vehicular and cellular wireless device colocation using uplink communications in accordance with aspects of the present disclosure.

FIG. 11 shows a block diagram 1100 of a communications manager 1120 that supports vehicular and cellular wireless device colocation using uplink communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of vehicular and cellular wireless device colocation using uplink communications as described herein. For example, the communications manager 1120 may include a cellular information component 1125, a positioning indication component 1130, a co-location determination component 1135, a vehicle information component 1140, a cellular positioning component 1145, a feedback reception component 1150, an SRS reception component 1155, an uplink periodicity component 1160, a downlink transmission component 1165, or any combination thereof. Each of these components may communicate, directly or indirectly, with one another (e.g., via one or more buses).

The communications manager 1120 may support wireless communications at a base station in accordance with examples as disclosed herein. The cellular information component 1125 may be configured as or otherwise support a means for receiving positioning information of a cellular UE. The positioning indication component 1130 may be configured as or otherwise support a means for transmitting the positioning information of the cellular UE to a sidelink wireless device co-located with the base station and in communication with a vehicle UE. The co-location determination component 1135 may be configured as or otherwise support a means for receiving, from the sidelink wireless device, an indication of the vehicle UE and the cellular UE being co-located.

In some examples, the feedback reception component 1150 may be configured as or otherwise support a means for receiving a feedback message from the cellular UE, where the feedback message corresponds to a downlink beam direction to be used for a downlink transmission to the cellular UE, where the positioning information is based on the feedback message.

In some examples, the SRS reception component 1155 may be configured as or otherwise support a means for receiving a sounding reference signal from the cellular UE, where the positioning information is based on the sounding reference signal.

In some examples, the SRS reception component 1155 may be configured as or otherwise support a means for estimating an angle of arrival parameter of the sounding reference signal, where the positioning information of the cellular UE is based on the angle of arrival parameter.

In some examples, the cellular information component 1125 may be configured as or otherwise support a means for receiving an indication of the positioning information from the cellular UE via a Uu communications link between the base station and the cellular UE, where the positioning information of the cellular UE is based on the indication of the positioning information.

In some examples, the vehicle information component 1140 may be configured as or otherwise support a means for receiving positioning information of a vehicle UE from the sidelink wireless device co-located with the base station.

In some examples, the uplink periodicity component 1160 may be configured as or otherwise support a means for reducing a feedback frequency for communications with the cellular UE based on determining that the cellular UE and the vehicle UE are co-located.

In some examples, the uplink periodicity component 1160 may be configured as or otherwise support a means for reducing a sounding reference signal frequency for communications with the cellular UE based on determining that the cellular UE and the vehicle UE are co-located.

In some examples, the uplink periodicity component 1160 may be configured as or otherwise support a means for configuring a period for periodic feedback messages or periodic sounding reference signals based on determining that the cellular UE and the vehicle UE are co-located.

In some examples, the downlink transmission component 1165 may be configured as or otherwise support a means for determining a downlink transmission beam direction or a downlink transmission beam codebook for communicating with the cellular UE or the vehicle UE, or both, based on determining that the vehicle UE and the cellular UE are co-located.

Additionally or alternatively, the communications manager 1120 may support wireless communications at a base station in accordance with examples as disclosed herein. The vehicle information component 1140 may be configured as or otherwise support a means for receiving positioning information of a vehicle UE from a sidelink wireless device co-located with the base station and in communication with the vehicle UE. The cellular positioning component 1145 may be configured as or otherwise support a means for receiving positioning information of a cellular UE. In some examples, the co-location determination component 1135 may be configured as or otherwise support a means for determining that the cellular UE and the vehicle UE are co-located based on the positioning information of the vehicle UE and the positioning information of the cellular UE.

In some examples, the feedback reception component 1150 may be configured as or otherwise support a means for receiving a feedback message from the cellular UE, where the feedback message corresponds to a downlink beam direction to be used for a downlink transmission to the cellular UE, where the positioning information is based on the feedback message.

In some examples, the SRS reception component 1155 may be configured as or otherwise support a means for receiving a sounding reference signal from the cellular UE, where the positioning information is based on the sounding reference signal.

In some examples, the SRS reception component 1155 may be configured as or otherwise support a means for estimating an angle of arrival parameter of the sounding reference signal, where the positioning information is based on the angle of arrival parameter.

In some examples, the cellular information component 1125 may be configured as or otherwise support a means for receiving an indication of the positioning information from the cellular UE via a Uu communications link between the base station and the cellular UE, where the positioning information of the cellular UE is based on the indication.

In some examples, the vehicle information component 1140 may be configured as or otherwise support a means for receiving positioning information of a vehicle UE from the sidelink wireless device co-located with the base station, where the positioning information is based on the receiving.

In some examples, the uplink periodicity component 1160 may be configured as or otherwise support a means for reducing a feedback frequency for communications with the cellular UE based on determining that the cellular UE and the vehicle UE are co-located.

In some examples, the uplink periodicity component 1160 may be configured as or otherwise support a means for reducing a sounding reference signal frequency for communications with the cellular UE based on determining that the cellular UE and the vehicle UE are co-located.

In some examples, the uplink periodicity component 1160 may be configured as or otherwise support a means for configuring a period for periodic feedback messages or periodic sounding reference signal based on determining that the cellular UE and the vehicle UE are co-located.

In some examples, the downlink transmission component 1165 may be configured as or otherwise support a means for determining a downlink transmission beam direction or a downlink transmission beam codebook for communicating with the cellular UE or the vehicle UE, or both, based on determining that the vehicle UE and the cellular UE are co-located.

In some examples, the positioning information of the vehicle UE includes one or more of location information, trajectory information, or a combination thereof.

Figure 12:
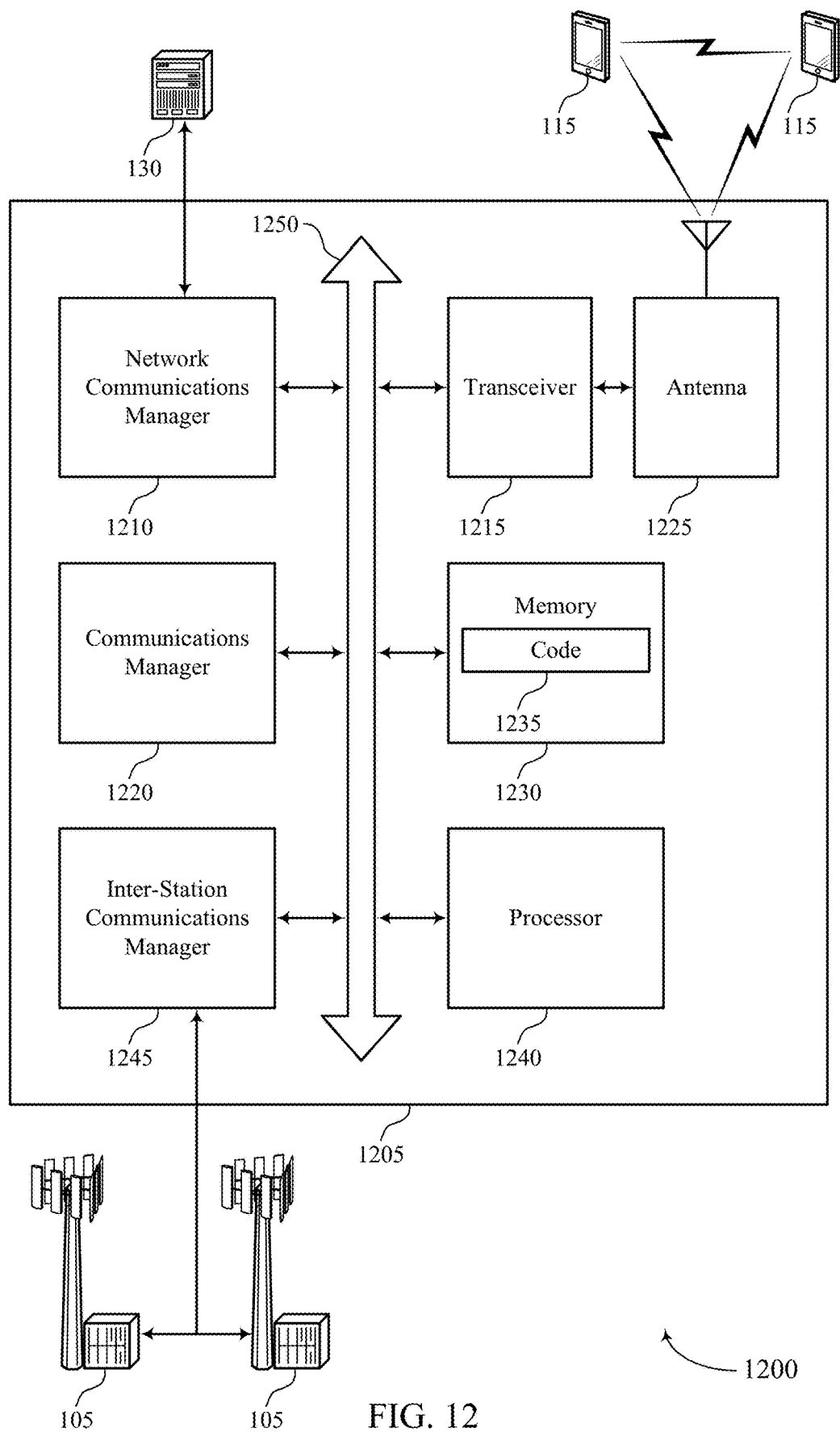
FIG. 12 shows a diagram of a system including a device that supports vehicular and cellular wireless device colocation using uplink communications in accordance with aspects of the present disclosure.

FIG. 12 shows a diagram of a system 1200 including a device 1205 that supports vehicular and cellular wireless device colocation using uplink communications in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting vehicular and cellular wireless device colocation using uplink communications). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving positioning information of a cellular UE. The communications manager 1220 may be configured as or otherwise support a means for transmitting the positioning information of the cellular UE to a sidelink wireless device co-located with the base station and in communication with a vehicle UE. The communications manager 1220 may be configured as or otherwise support a means for receiving, from the sidelink wireless device, an indication of the vehicle UE and the cellular UE being co-located.

Additionally or alternatively, the communications manager 1220 may support wireless communications at a base station in accordance with examples as disclosed herein. For example, the communications manager 1220 may be configured as or otherwise support a means for receiving positioning information of a vehicle UE from a sidelink wireless device co-located with the base station and in communication with the vehicle UE. The communications manager 1220 may be configured as or otherwise support a means for receiving positioning information of a cellular UE. The communications manager 1220 may be configured as or otherwise support a means for determining that the cellular UE and the vehicle UE are co-located based on the positioning information of the vehicle UE and the positioning information of the cellular UE.

By including or configuring the communications manager 1220 in accordance with examples as described herein, the device 1205 may support techniques for a device 1205 (e.g., a base station) determining device co-locations of a V-UE and one or more C-UEs. The device 1205 may coordinate the co-location determination with a sidelink wireless device (e.g., a RSU). The device 1205 may provide positioning indications to a sidelink wireless device, and may operate receiver 1210 to receive positioning information from a C-UE, or a co-location indication from the sidelink wireless device. The device 1205 may then alter communications with UEs 115 based co-location determinations. The device 1205 may improve efficiency of communications with the one or more UEs 115.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of vehicular and cellular wireless device colocation using uplink communications as described herein, or the processor 1240 and the memory 1230 may be otherwise configured to perform or support such operations.

Figure 13:
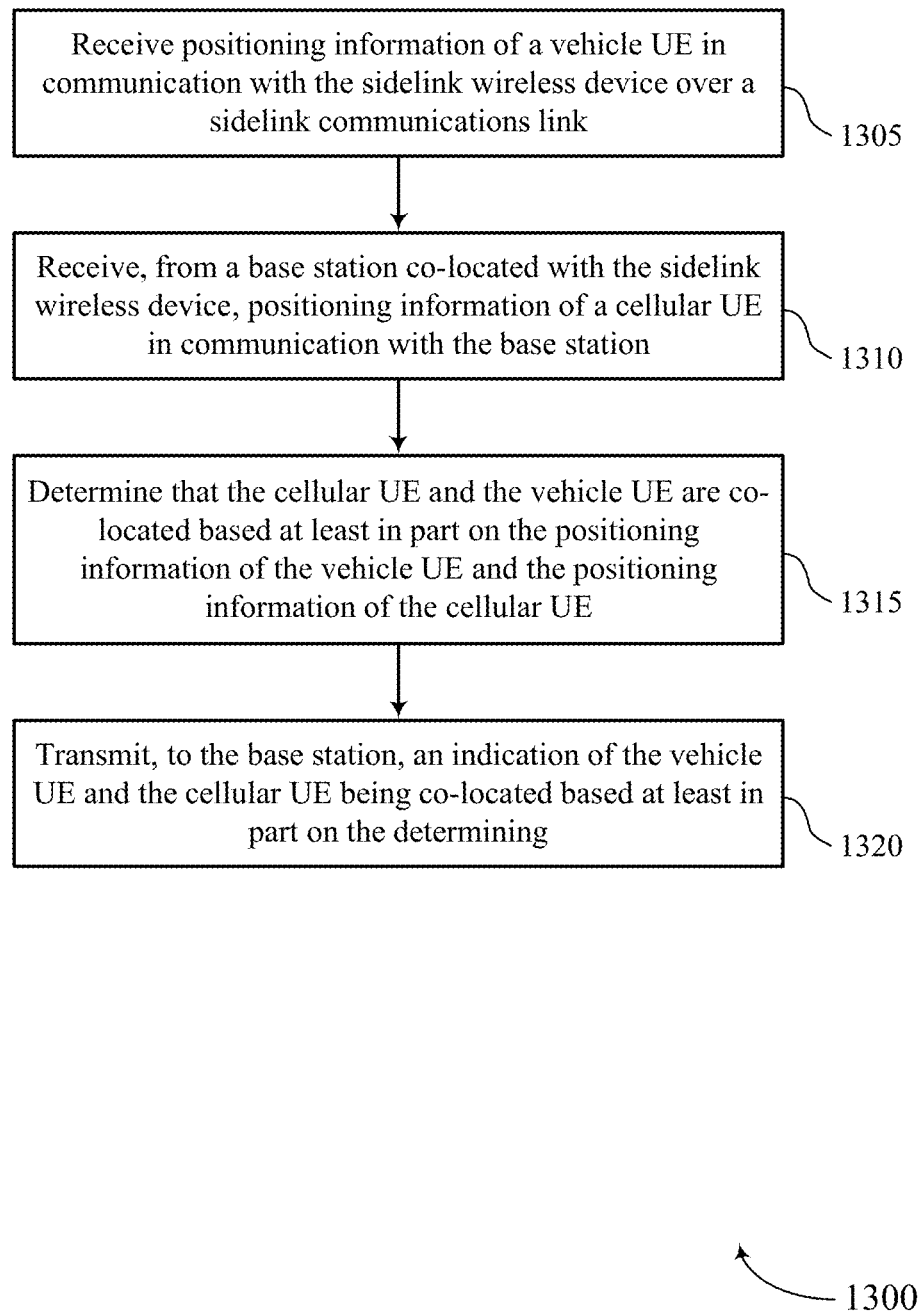
FIGS. 13 through 16 show flowcharts illustrating methods that support vehicular and cellular wireless device colocation using uplink communications in accordance with aspects of the present disclosure.

FIG. 13 shows a flowchart illustrating a method 1300 that supports vehicular and cellular wireless device colocation using uplink communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving positioning information of a vehicle UE in communication with the sidelink wireless device over a sidelink communications link. The operations of 1305 may be performed in accordance with examples as disclosed herein. In some examples, aspects of the operations of 1305 may be performed by a vehicle positioning component 725 as described with reference to FIG. 7.

At 1310, the method may include receiving, from a base station co-located with the sidelink wireless device, positioning information of a cellular UE in communication with the base station. The operations of 1310 may be performed in accordance with examples as disclosed herein. In some examples, aspects of the operations of 1310 may be performed by a cellular positioning component 730 as described with reference to FIG. 7.

At 1315, the method may include determining that the cellular UE and the vehicle UE are co-located based on the positioning information of the vehicle UE and the positioning information of the cellular UE. The operations of 1315 may be performed in accordance with examples as disclosed herein. In some examples, aspects of the operations of 1315 may be performed by a co-location component 735 as described with reference to FIG. 7.

At 1320, the method may include transmitting, to the base station, an indication of the vehicle UE and the cellular UE being co-located based on the determining. The operations of 1320 may be performed in accordance with examples as disclosed herein. In some examples, aspects of the operations of 1320 may be performed by a co-location indication component 740 as described with reference to FIG. 7.

Figure 14:
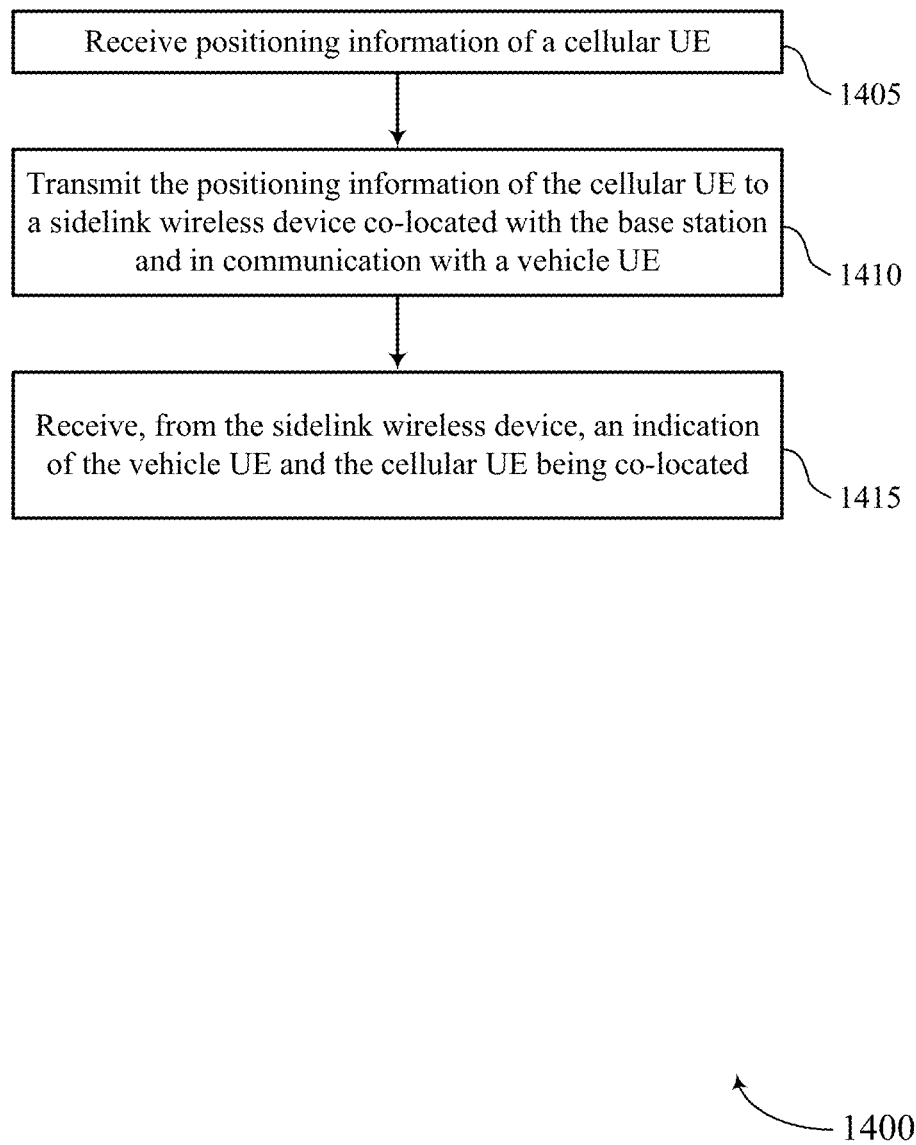

FIG. 14 shows a flowchart illustrating a method 1400 that supports vehicular and cellular wireless device colocation using uplink communications in accordance with aspects of the present disclosure. The operations of the method 1400 may be implemented by a base station or its components as described herein. For example, the operations of the method 1400 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1405, the method may include receiving positioning information of a cellular UE. The operations of 1405 may be performed in accordance with examples as disclosed herein. In some examples, aspects of the operations of 1405 may be performed by a cellular information component 1125 as described with reference to FIG. 11.

At 1410, the method may include transmitting the positioning information of the cellular UE to a sidelink wireless device co-located with the base station and in communication with a vehicle UE. The operations of 1410 may be performed in accordance with examples as disclosed herein. In some examples, aspects of the operations of 1410 may be performed by a positioning indication component 1130 as described with reference to FIG. 11.

At 1415, the method may include receiving, from the sidelink wireless device, an indication of the vehicle UE and the cellular UE being co-located. The operations of 1415 may be performed in accordance with examples as disclosed herein. In some examples, aspects of the operations of 1415 may be performed by a co-location determination component 1135 as described with reference to FIG. 11.

Figure 15:
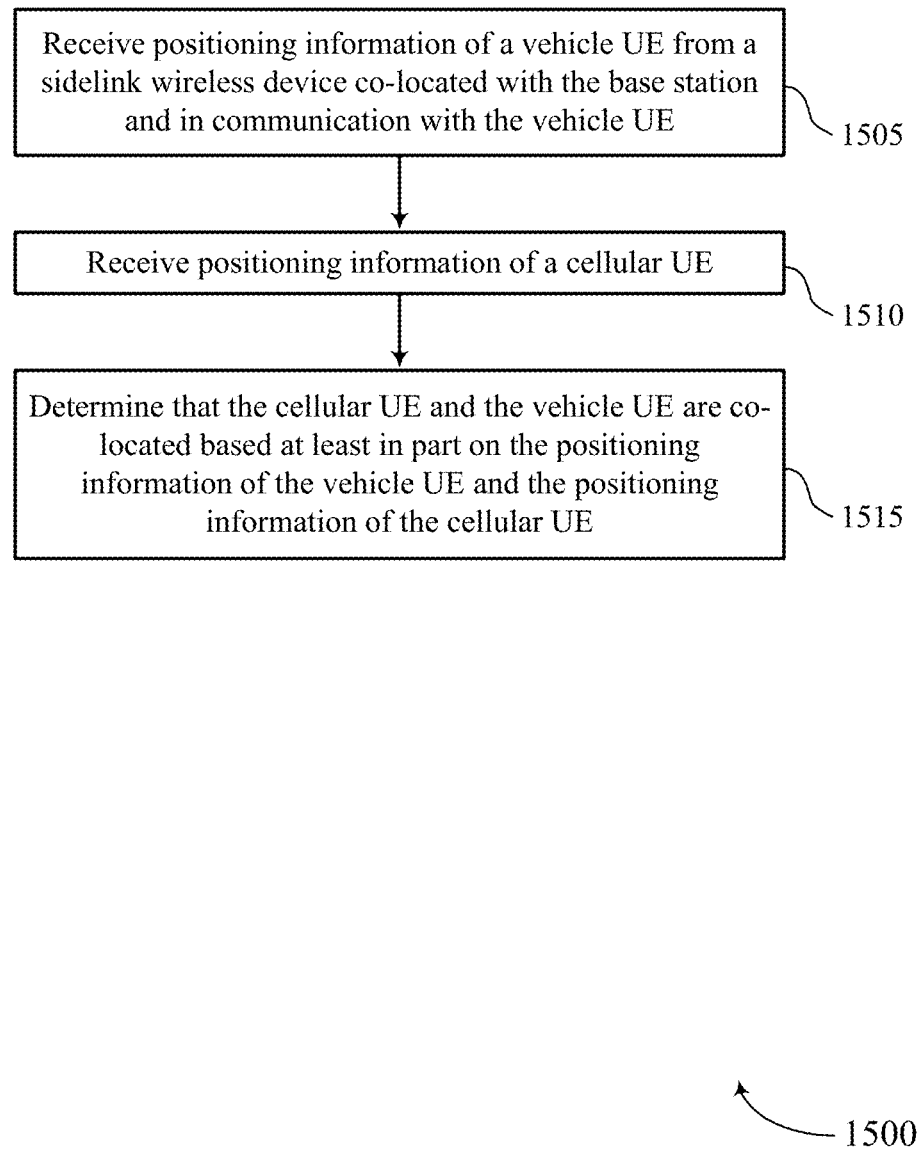

FIG. 15 shows a flowchart illustrating a method 1500 that supports vehicular and cellular wireless device colocation using uplink communications in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving positioning information of a vehicle UE from a sidelink wireless device co-located with the base station and in communication with the vehicle UE. The operations of 1505 may be performed in accordance with examples as disclosed herein. In some examples, aspects of the operations of 1505 may be performed by a vehicle information component 1140 as described with reference to FIG. 11.

At 1510, the method may include receiving positioning information of a cellular UE. The operations of 1510 may be performed in accordance with examples as disclosed herein. In some examples, aspects of the operations of 1510 may be performed by a cellular positioning component 1145 as described with reference to FIG. 11.

At 1515, the method may include determining that the cellular UE and the vehicle UE are co-located based on the positioning information of the vehicle UE and the positioning information of the cellular UE. The operations of 1515 may be performed in accordance with examples as disclosed herein. In some examples, aspects of the operations of 1515 may be performed by a co-location determination component 1135 as described with reference to FIG. 11.

Figure 16:
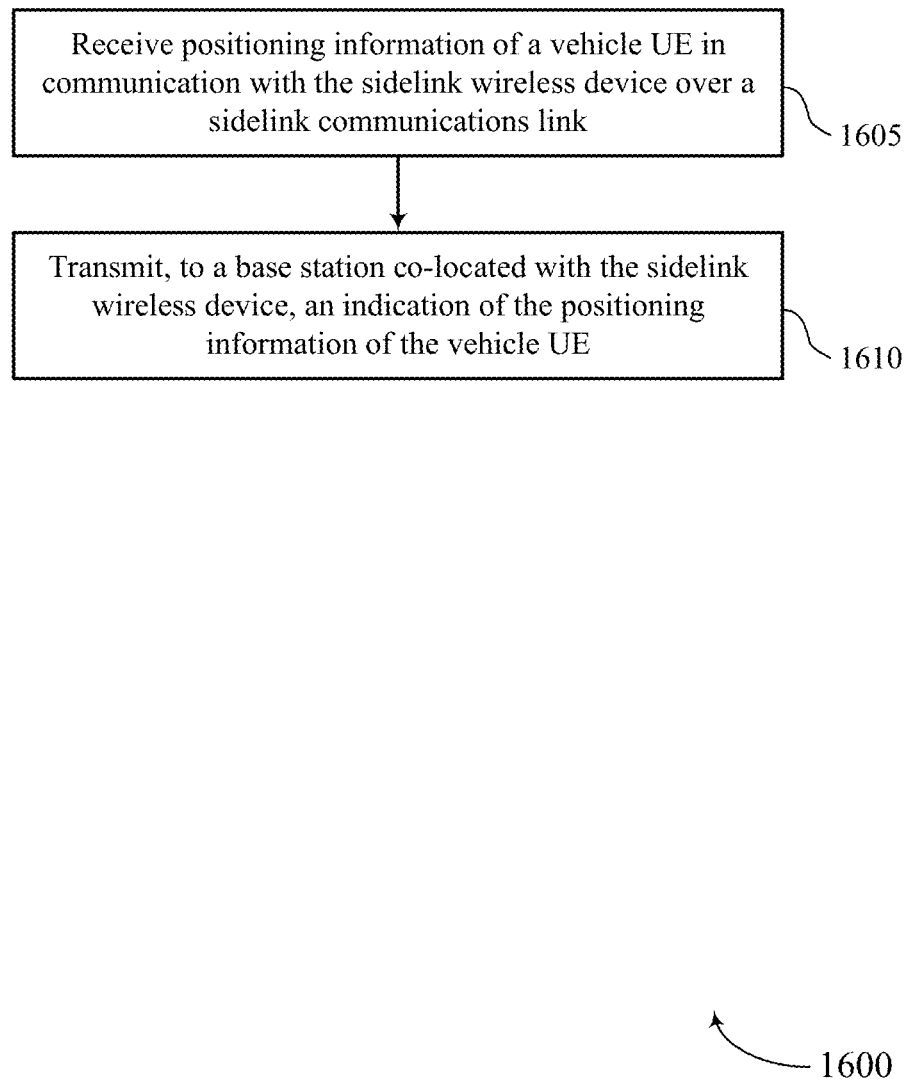

FIG. 16 shows a flowchart illustrating a method 1600 that supports vehicular and cellular wireless device colocation using uplink communications in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving positioning information of a vehicle UE in communication with the sidelink wireless device over a sidelink communications link. The operations of 1605 may be performed in accordance with examples as disclosed herein.

In some examples, aspects of the operations of 1605 may be performed by a vehicle positioning component 725 as described with reference to FIG. 7.

At 1610, the method may include transmitting, to a base station co-located with the sidelink wireless device, an indication of the positioning information of the vehicle UE. The operations of 1610 may be performed in accordance with examples as disclosed herein. In some examples, aspects of the operations of 1610 may be performed by a co-location indication component 740 as described with reference to FIG. 7.

The following provides an overview of aspects of the present disclosure:

Aspect 1: A method for wireless communications at a sidelink wireless device, comprising: receiving positioning information of a V-UE in communication with the sidelink wireless device over a sidelink communications link; receiving, from a base station co-located with the sidelink wireless device, positioning information of a C-UE in communication with the base station; determining that the C-UE and the V-UE are co-located based at least in part on the positioning information of the V-UE and the positioning information of the C-UE; and transmitting, to the base station, an indication of the V-UE and the C-UE being co-located based at least in part on the determining.

Aspect 2: The method of aspect 1, further comprising: receiving sidelink signaling from the V-UE wherein the positioning information comprises a location of the V-UE, a speed of the V-UE, a trajectory of the V-UE, or any combination thereof, based at least in part on the sidelink signaling.

Aspect 3: The method of any of aspects 1 through 2, wherein determining that the C-UE and the V-UE are co-located comprises: determining that the positioning information of the C-UE and the positioning information of the V-UE comprises one or more of a same location, at least a partially overlapping trajectory, at least a partially overlapping trajectory for a threshold period of time, or a combination thereof.

Aspect 4: The method of any of aspects 1 through 3, further comprising: transmitting application layer information of the V-UE to the base station, the application layer information comprising one or more of location information of the V-UE, speed information of the V-UE, trajectory information of the V-UE, or a combination thereof.

Aspect 5: A method for wireless communications at a base station, comprising: receiving positioning information of a C-UE; transmitting the positioning information of the C-UE to a sidelink wireless device co-located with the base station and in communication with a V-UE; and receiving, from the sidelink wireless device, an indication of the V-UE and the C-UE being co-located.

Aspect 6: The method of aspect 5, further comprising: receiving a feedback message from the C-UE, wherein the feedback message corresponds to a downlink beam direction to be used for a downlink transmission to the C-UE, wherein the positioning information is based at least in part on the feedback message.

Aspect 7: The method of any of aspects 5 through 6, further comprising: receiving a SRS from the C-UE, wherein the positioning information is based at least in part on the SRS Aspect 8: The method of aspect 7, further comprising: estimating an AoA parameter of the SRS, wherein the positioning information of the C-UE is based at least in part on the AoA parameter Aspect 9: The method of any of aspects 5 through 8, further comprising: receiving an indication of the positioning information from the C-UE via a Uu communications link between the base station and the C-UE, wherein the positioning information of the C-UE is based at least in part on the indication of the positioning information Aspect 10: The method of any of aspects 5 through 9, further comprising: receiving positioning information of a V-UE from the sidelink wireless device co-located with the base station.

Aspect 11: The method of any of aspects 5 through 10, further comprising: reducing a feedback frequency for communications with the C-UE based at least in part on determining that the C-UE and the V-UE are co-located.

Aspect 12: The method of any of aspects 5 through 11, further comprising: reducing a SRS frequency for communications with the C-UE based at least in part on determining that the C-UE and the V-UE are co-located.

Aspect 13: The method of any of aspects 5 through 12, further comprising: configuring a period for periodic feedback messages or periodic SRSs based at least in part on determining that the C-UE and the V-UE are co-located.

Aspect 14: The method of any of aspects 5 through 13, further comprising: determining a downlink transmission beam direction or a downlink transmission beam codebook for communicating with the C-UE or the V-UE, or both, based at least in part on determining that the V-UE and the C-UE are co-located.

Aspect 15: A method for wireless communications at a base station, comprising: receiving positioning information of a V-UE from a sidelink wireless device co-located with the base station and in communication with the V-UE; receiving positioning information of a C-UE; and determining that the C-UE and the V-UE are co-located based at least in part on the positioning information of the V-UE and the positioning information of the C-UE.

Aspect 16: The method of aspect 15, further comprising: receiving a feedback message from the C-UE, wherein the feedback message corresponds to a downlink beam direction to be used for a downlink transmission to the C-UE, wherein the positioning information is based at least in part on the feedback message Aspect 17: The method of any of aspects 15 through 16, further comprising: receiving a SRS from the C-UE, wherein the positioning information is based at least in part on the SRS Aspect 18: The method of aspect 17, further comprising: estimating an AoA parameter of the SRS, wherein the positioning information is based at least in part on the AoA parameter Aspect 19: The method of any of aspects 15 through 18, further comprising: receiving an indication of the positioning information from the C-UE via a Uu communications link between the base station and the C-UE, wherein the positioning information of the C-UE is based at least in part on the indication Aspect 20: The method of any of aspects 15 through 19, further comprising: receiving positioning information of a V-UE from the sidelink wireless device co-located with the base station, wherein the positioning information is based at least in part on the receiving Aspect 21: The method of any of aspects 15 through 20, further comprising: reducing a feedback frequency for communications with the C-UE based at least in part on determining that the C-UE and the V-UE are co-located.

Aspect 22: The method of any of aspects 15 through 21, further comprising: reducing a SRS frequency for communications with the C-UE based at least in part on determining that the C-UE and the V-UE are co-located.

Aspect 23: The method of any of aspects 15 through 22, further comprising: configuring a period for periodic feedback messages or periodic SRS based at least in part on determining that the C-UE and the V-UE are co-located.

Aspect 24: The method of any of aspects 15 through 23, further comprising: determining a downlink transmission beam direction or a downlink transmission beam codebook for communicating with the C-UE or the V-UE, or both, based at least in part on determining that the V-UE and the C-UE are co-located.

Aspect 25: The method of any of aspects 15 through 24, wherein the positioning information of the V-UE comprises one or more of location information, trajectory information, or a combination thereof.

Aspect 26: A method for wireless communications at a sidelink wireless device, comprising: receiving positioning information of a V-UE in communication with the sidelink wireless device over a sidelink communications link; and transmitting, to a base station co-located with the sidelink wireless device, an indication of the positioning information of the V-UE.

Aspect 27: The method of aspect 26, wherein determining positioning information of the V-UE comprises: receiving sidelink signaling from the V-UE, wherein the positioning information is based at least in part on the sidelink signaling, wherein the positioning information comprises a location of the V-UE, a speed of the V-UE, a trajectory of the V-UE, or any combination thereof.

Aspect 28: An apparatus for wireless communications at a sidelink wireless device, comprising a processor; memory coupled with the processor; and instructions stored in the memory and executable by the processor to cause the apparatus to perform a method of any of aspects 1 through 4.

Aspect 29: An apparatus for wireless communications at a sidelink wireless device, comprising at least one means for performing a method of any of aspects 1 through 4.

Aspect 30: A non-transitory computer-readable medium storing code for wireless communications at a sidelink wireless device, the code comprising instructions executable by a processor to perform a method of any of aspects 1 through 4.

Aspect 31: An apparatus for wireless communications at a base station, comprising a processor; memory coupled with the processor; and instructions stored in the memory and executable by the processor to cause the apparatus to perform a method of any of aspects 5 through 14.

Aspect 32: An apparatus for wireless communications at a base station, comprising at least one means for performing a method of any of aspects 5 through 14.

Aspect 33: A non-transitory computer-readable medium storing code for wireless communications at a base station, the code comprising instructions executable by a processor to perform a method of any of aspects 5 through 14.

Aspect 34: An apparatus for wireless communications at a base station, comprising a processor; memory coupled with the processor; and instructions stored in the memory and executable by the processor to cause the apparatus to perform a method of any of aspects 15 through 25.

Aspect 35: An apparatus for wireless communications at a base station, comprising at least one means for performing a method of any of aspects 15 through 25.

Aspect 36: A non-transitory computer-readable medium storing code for wireless communications at a base station, the code comprising instructions executable by a processor to perform a method of any of aspects 15 through 25.

Aspect 37: An apparatus for wireless communications at a sidelink wireless device, comprising a processor; memory coupled with the processor; and instructions stored in the memory and executable by the processor to cause the apparatus to perform a method of any of aspects 26 through 27.

Aspect 38: An apparatus for wireless communications at a sidelink wireless device, comprising at least one means for performing a method of any of aspects 26 through 27.

Aspect 39: A non-transitory computer-readable medium storing code for wireless communications at a sidelink wireless device, the code comprising instructions executable by a processor to perform a method of any of aspects 26 through 27. It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a sidelink wireless device, comprising:
   receiving positioning information of a vehicle user equipment (UE) in communication with the sidelink wireless device via a sidelink communications link;
   receiving, from a network entity co-located with the sidelink wireless device, positioning information of a cellular UE in communication with the network entity; and
   transmitting, to the network entity, an indication of the vehicle UE and the cellular UE being co-located based at least in part on the positioning information of the cellular UE and the positioning information of the vehicle UE having at least partially overlapping trajectories for a threshold period of time.

2. The method of claim 1, further comprising: receiving sidelink signaling from the vehicle UE, wherein the positioning information comprises a location of the vehicle UE, a speed of the vehicle UE, a trajectory of the vehicle UE, or any combination thereof, based at least in part on the sidelink signaling.

3. The method of claim 1, wherein transmitting the indication of the vehicle UE and the cellular UE being co-located comprises: transmitting the indication of the vehicle UE and the cellular UE being co-located based at least in part on the positioning information of the cellular UE and the positioning information of the vehicle UE comprising a same location.

4. The method of claim 1, further comprising: transmitting application layer information of the vehicle UE to the network entity, the application layer information comprising one or more of location information of the vehicle UE, speed information of the vehicle UE, trajectory information of the vehicle UE, or a combination thereof.

5. A method for wireless communications at a network entity, comprising:
   receiving positioning information of a cellular user equipment (UE);
   transmitting the positioning information of the cellular UE to a sidelink wireless device co-located with the network entity and in communication with a vehicle UE; and
   receiving, from the sidelink wireless device, an indication of the vehicle UE and the cellular UE being co-located based at least in part on the cellular UE and the vehicle UE having at least partially overlapping trajectories for a threshold period of time.

6. The method of claim 5, further comprising: receiving a feedback message from the cellular UE, wherein the feedback message corresponds to a downlink beam direction to be used for a downlink transmission to the cellular UE, wherein the positioning information is based at least in part on the feedback message.

7. The method of claim 5, further comprising: receiving a sounding reference signal from the cellular UE, wherein the positioning information is based at least in part on the sounding reference signal.

8. The method of claim 7, further comprising: estimating an angle of arrival parameter of the sounding reference signal, wherein the positioning information of the cellular UE is based at least in part on the angle of arrival parameter.

9. The method of claim 5, further comprising: receiving an indication of the positioning information from the cellular UE via a Uu communications link between the network entity and the cellular UE, wherein the positioning information of the cellular UE is based at least in part on the indication of the positioning information.

10. The method of claim 5, further comprising: receiving positioning information of a vehicle UE from the sidelink wireless device co-located with the network entity.

11. The method of claim 5, further comprising: reducing a feedback frequency for communications with the cellular UE based at least in part on determining that the cellular UE and the vehicle UE are co-located.

12. The method of claim 5, further comprising: reducing a sounding reference signal frequency for communications with the cellular UE based at least in part on determining that the cellular UE and the vehicle UE are co-located.

13. The method of claim 5, further comprising: configuring a period for periodic feedback messages or periodic sounding reference signals based at least in part on determining that the cellular UE and the vehicle UE are co-located.

14. The method of claim 5, wherein a downlink transmission beam direction or a downlink transmission beam codebook for communicating with the cellular UE or the vehicle UE, or both, are based at least in part on the vehicle UE and the cellular UE being co-located.

15. A method for wireless communications at a network entity, comprising:
receiving positioning information of a vehicle user equipment (UE) from a sidelink wireless device co-located with the network entity and in communication with the vehicle UE;
receiving positioning information of a cellular UE; and
communicating with the cellular UE based at least in part on the cellular UE and the vehicle UE being co-located, wherein the positioning information of the vehicle UE and the positioning information of the cellular UE have at least partially overlapping trajectories for a threshold period of time.

16. The method of claim 15, further comprising: receiving a feedback message from the cellular UE, wherein the feedback message corresponds to a downlink beam direction to be used for a downlink transmission to the cellular UE, wherein the positioning information is based at least in part on the feedback message.

17. The method of claim 15, further comprising: receiving a sounding reference signal from the cellular UE, wherein the positioning information is based at least in part on the sounding reference signal.

18. The method of claim 17, further comprising: estimating an angle of arrival parameter of the sounding reference signal, wherein the positioning information is based at least in part on the angle of arrival parameter.

19. The method of claim 15, further comprising: receiving an indication of the positioning information from the cellular UE via a Uu communications link between the network entity and the cellular UE, wherein the positioning information of the cellular UE is based at least in part on the indication.

20. The method of claim 15, further comprising: reducing a feedback frequency for communications with the cellular UE based at least in part on determining that the cellular UE and the vehicle UE are co-located.

21. The method of claim 15, further comprising: reducing a sounding reference signal frequency for communications with the cellular UE based at least in part on determining that the cellular UE and the vehicle UE are co-located.

22. The method of claim 15, further comprising: configuring a period for periodic feedback messages or periodic sounding reference signal based at least in part on determining that the cellular UE and the vehicle UE are co-located.

23. The method of claim 15, further comprising: selecting a downlink transmission beam direction or a downlink transmission beam codebook for communicating with the cellular UE or the vehicle UE, or both, based at least in part on determining that the vehicle UE and the cellular UE are co-located.

24. The method of claim 15, wherein the positioning information of the vehicle UE comprises one or more of location information, trajectory information, or a combination thereof.

25. An apparatus for wireless communications at a sidelink wireless device, comprising:
a processor;
memory coupled with the processor; and
one or more instructions stored in the memory and executable by the processor to cause the apparatus to, based at least in part on the one or more instructions:
receive positioning information of a vehicle user equipment (UE) in communication with the sidelink wireless device over a sidelink communications link;
receive, from a network entity co-located with the sidelink wireless device, positioning information of a cellular UE in communication with the network entity; and
transmit, to the network entity, an indication of the vehicle UE and the cellular UE being co-located based at least in part on the position information of the cellular UE and the position information of the vehicle UE having at least partially overlapping trajectory for a threshold period of time.

26. The apparatus of claim 25, wherein the one or more instructions are further executable by the processor to cause the apparatus to: receiving sidelink signaling from the vehicle UE wherein the positioning information comprises a location of the vehicle UE, a speed of the vehicle UE, a trajectory of the vehicle UE, or any combination thereof, based at least in part on the sidelink signaling.

* * * * *